United States Patent
Hermey et al.

(10) Patent No.: US 12,331,809 B2
(45) Date of Patent: Jun. 17, 2025

(54) HYBRID ENERGY GUIDE CHAIN FOR LARGE CANTILEVERED LENGTHS AND A SEPARATING WEB FOR AN ENERGY GUIDE CHAIN

(71) Applicant: IGUS GMBH, Cologne (DE)

(72) Inventors: Andreas Hermey, Hennef (DE); Bilal Yilmaz, Cologne (DE)

(73) Assignee: IGUS GMBH, Cologne (DE)

( * ) Notice: Subject to any disclaimer, the term of this patent is extended or adjusted under 35 U.S.C. 154(b) by 730 days.

(21) Appl. No.: 17/593,095

(22) PCT Filed: Mar. 9, 2020

(86) PCT No.: PCT/EP2020/056215
§ 371 (c)(1),
(2) Date: Sep. 9, 2021

(87) PCT Pub. No.: WO2020/182727
PCT Pub. Date: Sep. 17, 2020

(65) Prior Publication Data
US 2022/0145964 A1    May 12, 2022

(30) Foreign Application Priority Data
Mar. 9, 2019    (DE) ...................... 20 2019 101 354.0

(51) Int. Cl.
*F16G 13/16*    (2006.01)
*F16G 13/14*    (2006.01)
(Continued)

(52) U.S. Cl.
CPC ............. *F16G 13/16* (2013.01); *F16G 13/14* (2013.01); *F16L 3/015* (2013.01); *H02G 11/006* (2013.01)

(58) Field of Classification Search
CPC .......... F16G 13/16; F16G 13/14; F16G 13/12; F16G 13/00; F16L 3/015; H02G 11/006
(Continued)

(56) References Cited

U.S. PATENT DOCUMENTS

| 4,813,224 A | 3/1989 | Blase |
| 4,858,424 A * | 8/1989 | Loding ................ H02G 11/006 248/51 |

(Continued)

FOREIGN PATENT DOCUMENTS

| CN | 103635712 A | 3/2014 |
| CN | 205669561 | 11/2016 |

(Continued)

OTHER PUBLICATIONS

Office Action from related Chinese Patent Application No. 202080031469.5, dated Aug. 27, 2023. English translation attached.
(Continued)

*Primary Examiner* — Nkeisha Smith
(74) *Attorney, Agent, or Firm* — Grossman, Tucker, Perreault & Pfleger, PLLC

(57) ABSTRACT

An energy guide chain including two plate comprising successive chain plates which respectively partially overlap with each other in overlap regions. A respective side part of plastic is associated with each second chain plate. The chain plates are made from a different material from the side parts and have through apertures in their overlap regions. In its two end regions each side part has a plurality of projections which respectively engage through the overlapping apertures in the associated chain plate and the respectively adjoining chain plate to limit the relative pivotal angle of successive chain plates and/or to connect same. In addition there is proposed a two-part separating web for an energy guide chain, wherein the first part has at least one securing
(Continued)

pin and the second part has at least one securing receiving means so that the two parts can be connected and released in a direction perpendicular to the main plane of the separating web.

18 Claims, 8 Drawing Sheets

(51) Int. Cl.
  *F16L 3/015* (2006.01)
  *H02G 11/00* (2006.01)

(58) Field of Classification Search
  USPC .......................................................... 248/68.1
  See application file for complete search history.

(56) References Cited

U.S. PATENT DOCUMENTS

| | | | | |
|---|---|---|---|---|
| 5,016,841 | A * | 5/1991 | Schumann | H02G 11/006 248/51 |
| 6,161,372 | A * | 12/2000 | Wehler | H02G 11/006 59/900 |
| 6,349,534 | B1 * | 2/2002 | Zanolla | F16G 13/16 248/51 |
| 7,513,097 | B2 * | 4/2009 | Utaki | F16G 13/16 59/900 |
| 9,803,721 | B2 * | 10/2017 | Glissman | H02G 3/0475 |
| 2003/0136456 | A1 | 7/2003 | Blase et al. | |
| 2005/0202915 | A1 * | 9/2005 | Pichura | F16G 5/18 474/215 |
| 2008/0271429 | A1 | 11/2008 | Komiya | |
| 2022/0140590 | A1 * | 5/2022 | Dommnik | H02G 11/00 174/68.1 |
| 2022/0145964 | A1 * | 5/2022 | Hermey | H02G 11/006 |
| 2024/0191776 | A1 * | 6/2024 | Strack | F16G 13/16 |

FOREIGN PATENT DOCUMENTS

| | | |
|---|---|---|
| DE | 3121912 | 12/1982 |
| DE | 3531066 | 3/1987 |
| DE | 19707966 | 9/1998 |
| DE | 10012298 | 11/2001 |
| DE | 10343263 | 5/2005 |
| DE | 102008020908 | 11/2008 |
| DE | 202015101707 | 11/2015 |
| GB | 2515242 | 4/2013 |
| KR | 200293663 | 7/2002 |
| KR | 10-2010-0099840 | 9/2010 |
| WO | 2017136827 | 8/2017 |

OTHER PUBLICATIONS

Office Action from related Japanese Patent Application No. 2021-552985, dated Jan. 30, 2024. English translation attached.

English translation of Office Action of Chinese Patent Application No. 202080031469.5, dated Jan. 5, 2023, 10 pages.

International Search Report from corresponding PCT Appln. No. PCT/EP2020/056215, dated Jun. 23, 2020.

International Preliminary Report on Patentability from corresponding PCT Appln. No. PCT/EP2020/056215, dated Mar. 9, 2020.

* cited by examiner

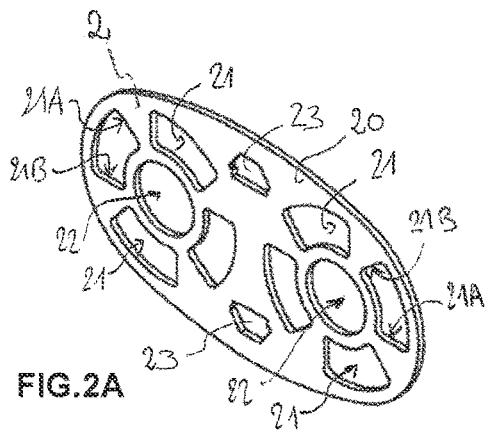
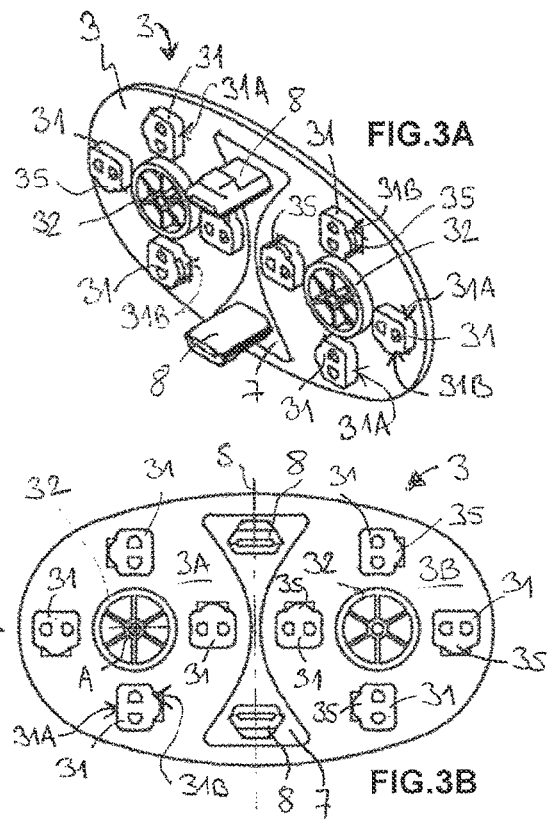
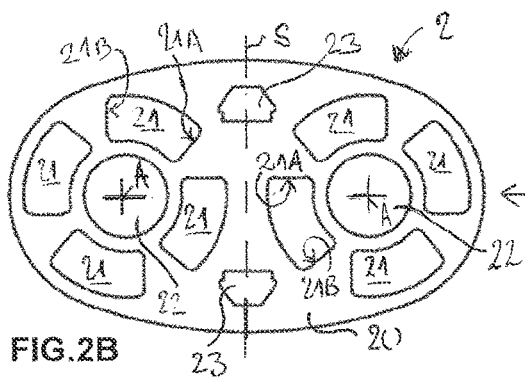
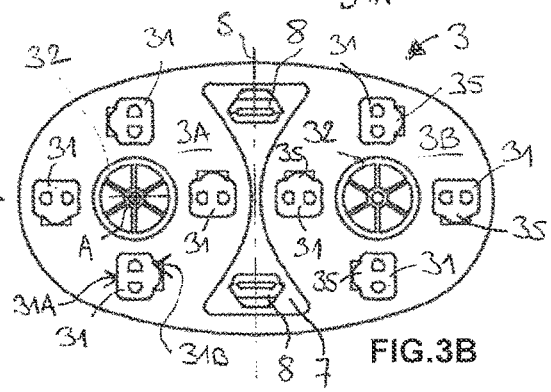
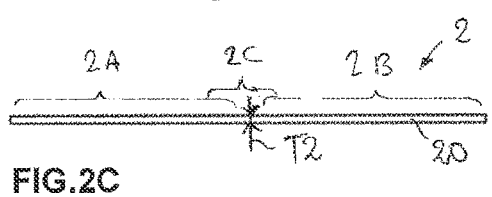
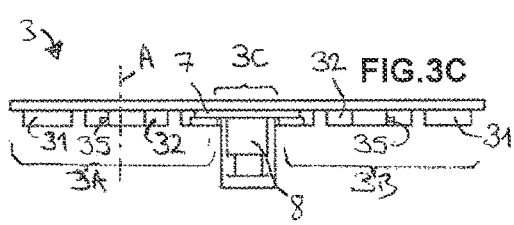
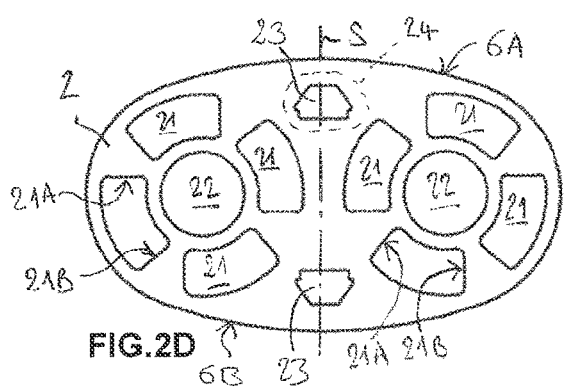
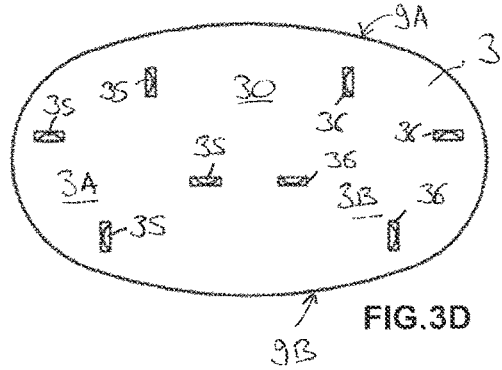

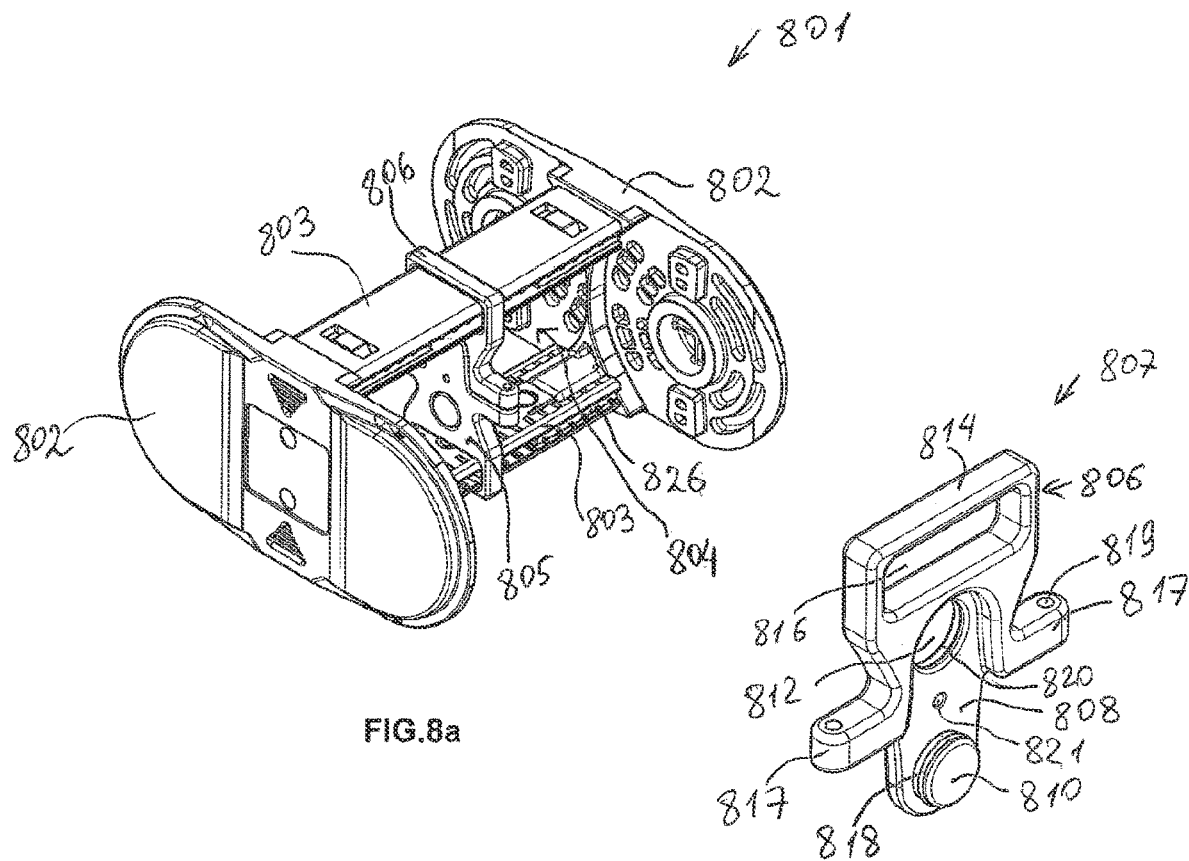
FIG.8a
FIG.8b
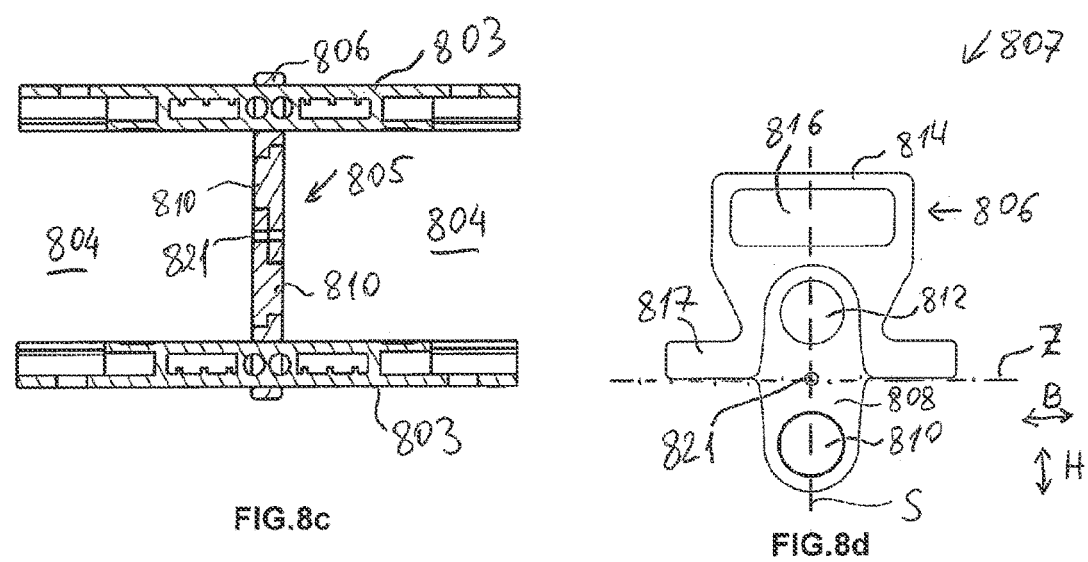
FIG.8c
FIG.8d

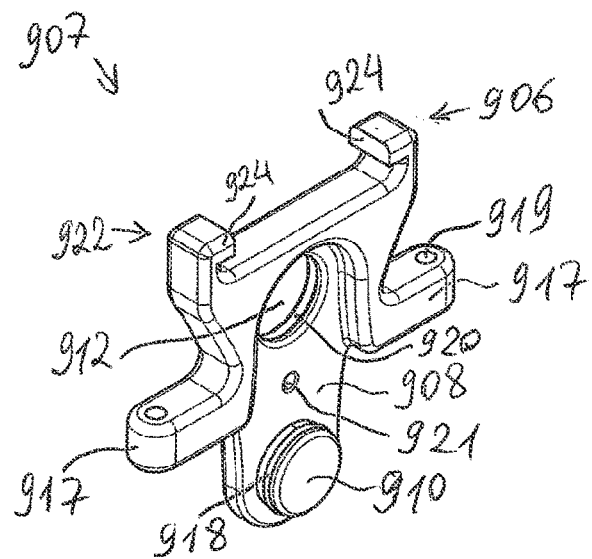
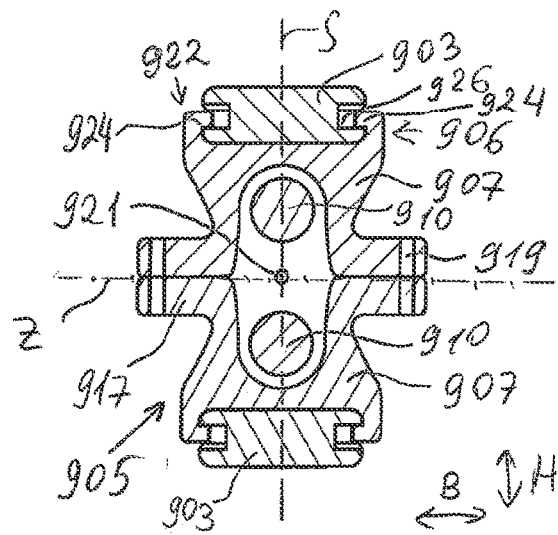
FIG.9a
FIG.9b
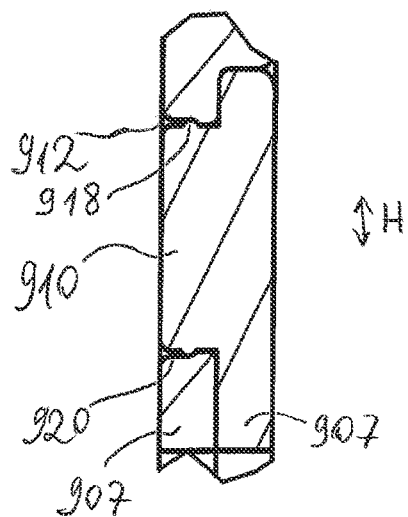
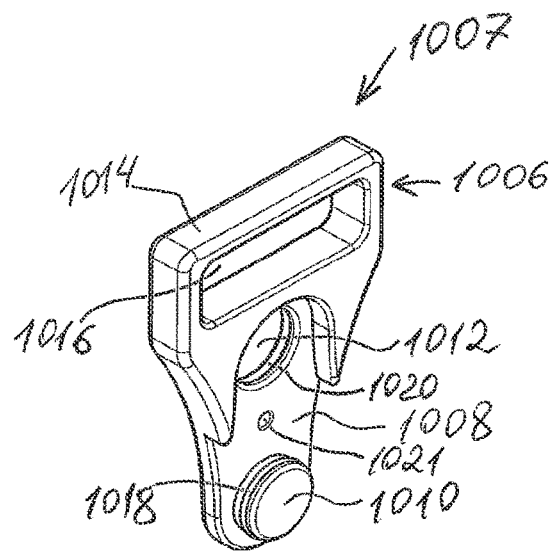
FIG.9c
FIG.10

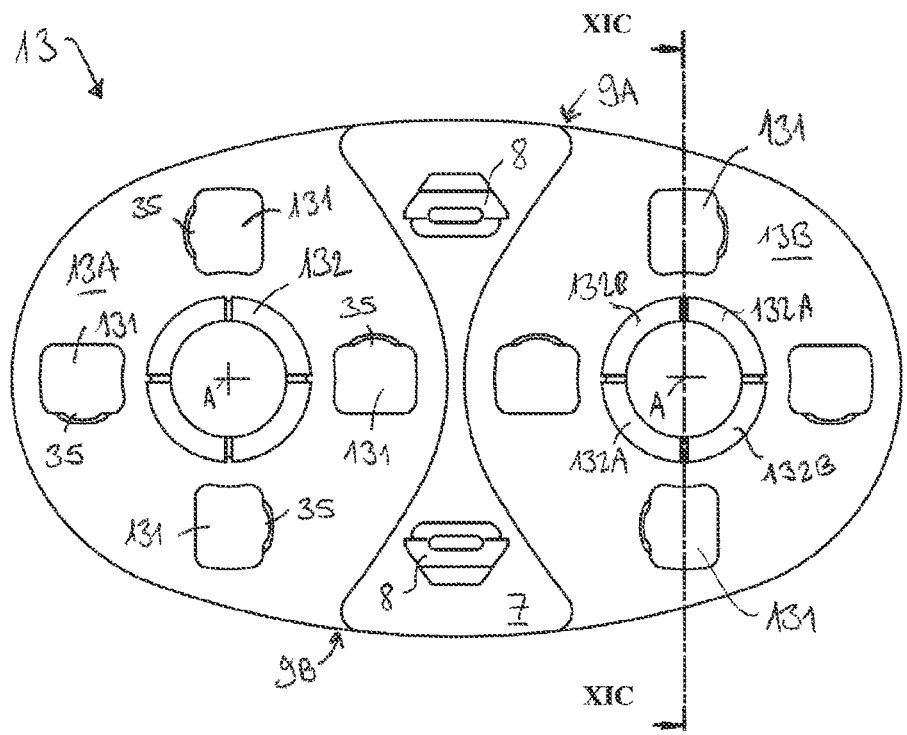
FIG.11A
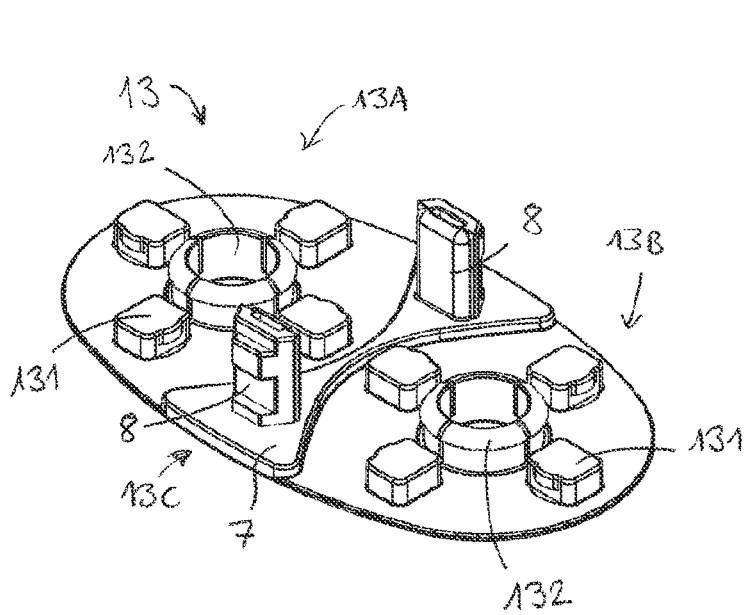 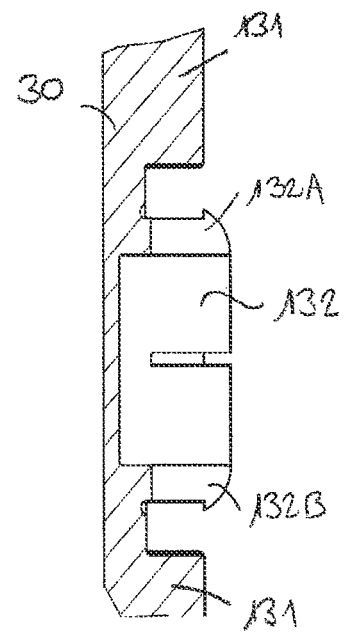
FIG.11B   FIG.11C

HYBRID ENERGY GUIDE CHAIN FOR LARGE CANTILEVERED LENGTHS AND A SEPARATING WEB FOR AN ENERGY GUIDE CHAIN

FIELD

The invention generally concerns an energy guide chain for dynamic guidance of supply lines like cables, hoses or the like between two connecting locations, of which at least one is moveable. An energy guide chain, also referred to as a drag chain, or cable carrier, serves in particular to protect the guided lines from unwanted stressing.

The invention concerns in particular an energy guide chain which is displaceable in one plane, for example horizontally or perpendicularly, and having two runs and therebetween a direction-changing region of a predetermined radius of curvature. In that arrangement a moveable run is to be capable of displacement or extension over a great length in unsupported or self-supporting relationship. Applications with a long self-supporting length involving relatively low dynamic stressing or low displacement frequency are for example telescopic jibs, lifting platforms, construction machinery and so forth.

BACKGROUND

Energy guide chains typically have chain links with laterally mutually opposite chain plates. The chain plates are connected together pivotably relative to each other to form lateral plate lines in the longitudinal direction and respectively overlap with one of two overlap regions. The chain links define a receiving space, in which the supply lines are guided and held.

The material of the chain plates is of crucial significance for the properties of an energy guide chain. Depending on the respective requirements of the application typically either chain plates of metal, for example steel or aluminium, or more frequently chain plates of plastic, typically in the form of injection mouldings comprising a possibly fibre-reinforced thermoplastic polymer, are used.

Chain plates of metal can withstand very high tensile forces and have a high level of mechanical strength, in particular high flexural strength with a high level of stiffness. That is advantageous in particular for applications involving long self-supporting lengths, that is to say a chain run which is not supported and which has a long self-supporting span, but chain plates of metal result inter alia in the energy guide chain being of a relatively high inherent weight and they do not allow the same freedoms in design configuration that are possible with plastic chain plates, mostly made by injection moulding.

Chain plates of plastic are lighter in construction and can also absorb high impact forces without permanent deformation, thanks to high elasticity in comparison with metal. Due to the elasticity or the comparatively lower modulus of elasticity however very long self-supporting lengths can generally only be implemented with chain plates of plastic when using comparatively large wall thicknesses.

The need was already recognised for properties of metal and plastic chain plates to be advantageously combined in energy guide chains in order to use the respectively desired advantages of both types. An energy guide chain comprising components of different materials, that are force-transmitting in the plate lines, comprising for example plastic and metal, is referred to herein as a hybrid energy guide chain.

WO 2017/136827 A1 and U.S. Pat. No. 9,803,721 B2 proposed a hybrid energy guide chain which with doubling of the plate lines at each side has a plate line comprising side parts of plastic and in addition thereto a plate line comprising chain plates of steel sheet. The side parts or chain plates of plastic are of a cranked configuration in that case, with laterally displaced overlap regions which include cooperating abutments for limiting the pivotal angle and a receiving means for a separate pivotal pin. The abutments of the plastic plates are of such sizes that they are operative before abutments of the metal plates butt against each other. The chain plates of steel sheet are arranged as alternate inner and outer plates, wherein the inner plates each have two overlap regions with projections, being so-called male connectors, and the outer plates each have two overlap regions with apertures, so-called as female connectors. Each chain link therefore comprises four side parts, namely two plates of plastic and two plates of metal, wherein those plates are connected by screwed transverse webs or bars. The structure disclosed in WO 2017/136827 A1 is thus very complex and expensive. The complexity and expense in terms of material and assembly substantially corresponds to the totalled complexity of two energy guide chains. In addition, for each desired radius in the direction-changing arc, four matching components are respectively correspondingly required. Accordingly the inherent weight is relatively high because of the doubled number of plates, which inter alia is in conflict with the aim of a long self-supporting length.

DE 100 12 298 A1 discloses an energy guide chain which has chain plates of metal, which are pivotably connected to each other. Each two chain plates are connected in their overlap region by a plastic side part. In the overlap region the chain plates have respective through apertures, into which projections of a respectively associated side part engage to define the pivot axis and the permissible pivotal angle. The diameter of the round plastic side part in that case corresponds to the surface area of the overlap region of the connected chain plates of metal. Accordingly the weight of the chain is reduced in relation to WO 2017/136827 A1, but the mechanical connection of the chain plates by the plastic side part represents a weak point. To provide safeguard against lateral detachment an additional metal bush with a collar is proposed, resulting in additional costs in material and assembly. A similar energy guide chain with pertures in chain plates and projections on round delimiting discs is described in DE3121912 A1, but without the material being specified.

A further solution was previously proposed with the hybrid energy guide chain disclosed in DE 197 07 966 A1 or U.S. Pat. No. 6,161,372 A. That arrangement uses special chain plates having a plate-shaped core with a core casing at least partially surrounding same. The core is made from a material which is of higher strength in comparison with the core casing. The advantages of for example metal plates and plastic plates can be combined in the same chain plate, that is to say no doubling of the chain plates is required here. The chain plates which in themselves are of a hybrid design are respectively connected by means of two complementary connecting parts of plastic. DE 103 43 263 A1 also proposed a chain plate with a high-strength core. Those two structures are markedly better in regard to inherent weight than the first-mentioned ones. The production costs of such hybrid chain plates however are comparatively high, for example an additional coating process has to be provided. In addition the assembly complexity and expenditure is similar to usual metal plates, that is to say higher than is usual and possible with chain plates of plastic.

SUMMARY

Taking the above-mentioned state of the art as the basic starting point a first object of the present invention is therefore to propose a hybrid energy guide chain which combines advantages of plastic chain plates and chain plates of a material of higher strength, wherein the energy guide chain at the same time is such that it can be produced from few individual parts or with a high degree of modularity and/or at lower assembly cost. The two energy guide chains are also to be of low inherent weight.

Furthermore in a further aspect a further independent object is to propose a novel separating web for an energy guide chain, which can be used as a safeguard against unwanted detachment of the transverse bars. That object—independently of the type of energy guide chain—is attained by a separating web. That separating web however is in particular also suitable for an energy guide chain according to the first aspect of the invention.

First Aspect (Hybrid Energy Guide Chain)

According to the first aspect of the invention in an energy guide chain of the general kind, the first object is already attained in that successive chain plates comprising a material of comparatively high strength and/or high stiffness, in particular with a comparatively greater modulus of elasticity, are respectively provided with through apertures in both overlap regions and said apertures in successive chain plates respectively at least partially overlap, wherein it is further provided that for each second of said chain plates there is provided a side part of plastic which respectively has in both end regions projections with which it engages through the overlapping through apertures of two respective chain plates, more specifically an associated chain plate and the respectively following chain plate adjoining the corresponding end region.

Projections of the first end region of the side part can thus engage through the through apertures in the first overlap region of the associated chain plate and projections of the second end region of the side part can thus engage through the apertures in the other second overlap region of the associated chain plate. In that arrangement the side part with its projections can connect the chain plate associated with the side part in its first overlap region to a first chain plate adjacent within the plate line and in its second overlap region to a second chain plate adjacent within the plate line. The projections of the side part can engage in both overlap regions respectively through the through apertures of the second chain plates, the associated chain plate and the chain plate adjacent thereto within the plate line. Each side part can therefore pivotably interconnect three chain plates which occur in succession in the plate line. In that case two respective ones of those three chain plates can pivot relative to the side part as the chain plate associated with the side part is connected to the side part in both of the overlap regions thereof.

In that case the side part is not rotatable with respect to the associated chain plate, through the two overlap regions of which it engages. That permits inter alia a more stable and less susceptible link connection.

Each link connection can be formed in particular by a respective overlap region of a chain plate, as overlap region of another chain plate and one of two end regions of a side part, wherein the side part is associated with one of the two connected chain plates. The other chain plate can be accommodated with one of its two overlap regions between an end region of the side part and the one chain plate with which the side part is associated.

The length dimension of the side part of plastic in the longitudinal direction of the plate line or the energy guide chain at least of the chain pitch (spacing between the pivot or link axes in the longitudinal direction). The base area of the side part of plastic (in side view) can preferably substantially correspond to that of the chain plates, but that is not necessarily the case. The base area of the side part of plastic can be selected to be slightly less, for example so that only the metal chain plates bear with their narrow sides against contact or support surfaces. Preferably the base area of the side part is >50% of that of the chain plate.

The chain plates comprising the material of higher strength and/or higher flexural stiffness can thus have through apertures or female connecting regions in their overlap regions for connection of the plates, with the apertures serving exclusively as receiving means, which allows a particularly simple structure for those chain plates, in particular in the form of identical parts. The side parts of plastic in contrast can be of a more complex geometry, with protruding projections which as male connecting elements connect the chain plates together by means of the through apertures or female connecting regions. The design configuration is thus optimally adapted to manufacturing processes which are already tried and tested, and there is no need for special technologies like for example a coating procedure.

In that respect in accordance with the invention projections of the side part are provided for limiting the relative pivotal angle between successive chain plates or for providing a hinged pivotable connection between successive chain plates or however preferably for both the above-mentioned purposes.

The structure proposed according to the invention with side parts of plastic in addition to chain plates comprising another material with a higher strength and/or greater modulus of elasticity is therefore to be provided at least in a longitudinal portion of the energy guide chain or each plate line, in particular in a critical region which, in the case of the run which is self-supporting in regular operation, is exposed to the highest loadings or deformation forces. For simplification purposes however the plate lines can be predominantly or completely throughout be produced using the proposed hybrid structure to avoid special transitional parts.

The high mechanical strength of the chain plates allows very long self-supporting lengths with comparatively small wall thicknesses, as can be achieved with chains comprising metal plates. In this case the chain plates can be of a particularly simple structure which is particularly inexpensive to produce while however being of high strength. The chain plates can be designed in particular exclusively with female connectors, that is to say for example without projecting parts for producing the joint connection. The total areal proportion of those through apertures or openings in that case, by virtue of high strength, can definitely be >40%, in particular in the range of 40% to 60%, of the overall base area (defined by the external contour) of the chain plate, that is to say the inherent weight is further reduced.

The side parts of plastic on the other hand make it possible to make use of desirable properties of conventional plastic plates in the energy guide chain or the chain links. The side plates can in particular be of a more complex geometry which permits simple, quick and possibly tool-free assembly.

By virtue of the use of successive chain plates comprising the material of higher strength or stiffness, by means of the side parts of plastic, it is also possible perceptibly to reduce the number of required components and assembly steps in comparison with the above-mentioned state of the art.

The modulus of elasticity (also referred to as the E-modulus, coefficient of elasticity or Young's modulus) of the material of the chain plates should preferably be at least three times, preferably at least five times, preferably at least ten times, the modulus of elasticity of the material of the side parts, to achieve a perceptible increase in the self-supporting length in comparison with plastic side plates. The modulus of elasticity of the material of the chain plates can be for example >50 MPa, preferably >70 MPa. The plastic of the side part, for example a glass fibre-reinforced polyamide, can in comparison have a modulus of elasticity <10 MPa. The transmission of force is effected by the chain plates of high strength and only by the projections or male connectors of the side parts of plastic. Accordingly only those projections of plastic have to be of corresponding dimensions to be sufficiently strong for operation, in particular to be resistant to a shearing action. The projections of plastic, that engage through the apertures, acting as abutments, also permit improved smoothness of operation in comparison with conventional chains comprising metal plates. Side parts of plastic, in spite of the more complex geometry, can be produced less expensively and of a light structure, in particular using injection moulding.

The side parts may be but do not have to be made from a fibre-reinforced plastic.

The side parts of plastic are not actual chain plates as no tensile or thrust forces have to be or should be transmitted by way of their main body. Nonetheless they enable the typical advantages of plastic plates, in particular low noise level at the abutments and a high level of design freedom for desired functional features like for example latching or snap-action connections. This can therefore be utilised to make the individual chain links as simple as possible and also to be able to fit them with few working steps. Increased costs for the side parts only immaterially exceed the costs for the production of typical link joint connections and fixing of the transverse bars, as is usual with conventional metal plates, or can possibly undercut same. In addition it is preferred to provide a side part of plastic only for each second chain plate comprising the material of high stiffness.

In addition to the projections or male connecting components on the side parts which in number preferably correspond to the number of through apertures in a chain plate various further functional regions can be provided with a low level of complexity and low manufacturing costs. Thus the connection to transverse bars or transverse members for forming box-shaped chain links can be provided for example solely on the side parts. Thus the chain plates can be particularly simple, for example in the form of a inexpensive stamped parts of steel sheet, with few production steps.

In a preferred development—at least in the critical lengthwise portion of the energy guide chain—at least the chain plates or the side parts and preferably both are each configured with a structurally identical basic shape. In principle each plate line can thus be made up as such from only two different components, namely the chain plates and the side parts. To produce closed chain links in the simplest case initially only one transverse bar selected according to the desired chain width is required.

In a preferred development—at least in the critical lengthwise portion of the energy guide chain—all chain plates and side parts in their main plane perpendicular to the pivot axes are of a substantially identical outside contour or substantially identical perimeter, in particular a respective elongatedly round, oval or eliptical perimeter.

In their overlap regions the chain plates in the simplest embodiment each have at least two generally arcuate through apertures which are arranged about a pivot axis and which for example can be in the form of a sector of a circular disc. The projections of the side part engage through those apertures so that, to limit the pivotal angle, the end regions of the projections respectively butt against corresponding abutment surfaces of a corresponding projection to limit the relative pivotal angle. In that case the pivotal angle can be limited in both directions towards the maximum pivotal angle in the direction-changing arc and towards the minimum pivotal angle in the straight position (to form the straight, in particular self-supporting run) to the same extent or on both sides with the same projection. In that way such an abutment-projection can have in particular two abutment surfaces which face away from each other and which in the pivotal direction cooperate at both sides with the delimiting ends of the apertures. The abutment surfaces are preferably in the form of flat even surfaces.

Adjustment of the desired radius in the direction-changing arc is effected by way of the limitation on the pivotal angle. With the structure according to the invention all desired radii can be achieved in particular by way of the dimensioning of the corresponding projections on the side parts, that is to say different angle limits are possible in the angled position with the same chain plate. By virtue of the angle variation by means of different side parts a single chain plate can be used as an identical part or a few different chain plates can be used for the entire design range. The chain plates can thus be more advantageously produced in larger numbers.

In addition or alternatively the chain plates in both overlap regions can each also have a circular through aperture in central relationship on the desired pivot axis. A corresponding projection of pin-like configuration on the side part of plastic can then engage into that aperture in order to form a rotary joint connection between successive chain plates. That joint projection can serve as a pin for a typical receiving means-pin pivotal connection, that is to say it has no abutment surfaces for limiting the pivotal angle. The rotatable connection however can alternatively be implemented solely by a suitable arcuate shape for the abutment-projections and a corresponding shape for the abutment-operative apertures in order further to simplify the structure of the side parts. In both variants the side parts each have projections which are suitable for providing the joint connection, in particular abutment-projections and/or joint projections, in both end regions or for two joint connections which occur in succession in the longitudinal direction.

Particularly preferably the side parts are each of the same structure and/or are produced in one piece or integrally, in particular in unitary material from the same plastic. The side parts can be arranged exclusively on one side in each plate line. In that case each side part, in relation to the associated chain plate, can respectively at least partially overlap the two chain plates adjoining those overlapping overlap regions.

In a preferred development all chain plates and side parts are of substantially congruent outside contours relative to each other. That permits inter alia a better rolling behaviour on the part of the direction-changing arc.

The chain plates are particularly preferably in the form of flat components without a cranked configuration or an offset. The chain plates are preferably formed in one piece and with a unitary material or monolithically from only one material, which permits markedly easier and more advantageous production in comparison with hybrid chain plates as disclosed in DE 197 07 966 A1.

The side parts are preferably provided with a flat main body without a crank configuration or projection in a lateral direction. That main body can be of a comparatively thin-walled structure as it does not have to transmit any tensile/thrust forces.

The chain plates can be produced in particular from a metal sheet, preferably steel sheet, for example stainless steel. As an alternative to steel or steel alloys the chain plates can also be made from aluminium or aluminium alloys. Alternatively chain plates of high strength, for example with a modulus of elasticity of >70 MPa, can also be made from composite fibre material, for example a GRP or a CRP. Basically a non-oxidising material is preferred. The chain plates are preferably produced in the form of flat components with a constant component thickness. The chain plates for example can be prepared in large numbers in the form of flat stamped parts or by other machining operations or cutting, for example from a strip steel or steel plate. The preferably constant wall thickness or plate thickness of the chain plates is preferably <10 mm and is preferably in the range of about 1 mm to 5 mm, preferably about 2 mm to 4 mm.

In a preferred embodiment the chain plates are so arranged that they are alternately laterally displaced relative to each other, that is to say in each plate line inner and outer chain plates alternate or occur in succession. In that case the chain plates can overlap, in particular exclusively or only at one side, with their overlap regions. In other words, in each plate line only two individual chain plates of the high-strength material always overlap. Accordingly no forked chain plates comprising two individual parts are used, and that reduces production costs, assembly expenditure and weight.

Preferably in that case the side parts are respectively arranged externally at each second chain plate. Together with the alternate arrangement of the chain plates that further simplifies assembly.

Particularly simple assembly and an inexpensive structure can be achieved if the connection between two plate lines is effected by transverse bars exclusively by means of the side parts, that is to say by each two opposite side parts being connected together by transverse bars. In a preferred embodiment that provides that at least one respective projecting fixing pin for a transverse bar is provided at the side part. The fixing pin can be provided in particular at or adjacent to the narrow sides in a central region between the end regions. The fixing pin can be adapted to provide a positively locking and/or force-locking connection to a suitable transverse bar, in particular of per se known structure or of an already existing series. Preferably two fixing pins are provided on the respective side part, in particular there is such a respective fixing pin near each narrow side. The fixing pin preferably projects to the same side as the projections so that this gives a flat outward side for the side part. Preferably two outside or laterally opposite side parts of a chain link are connected together by two separate transverse bars which are in opposite relationship in the heightwise direction, in particular to give a box-shaped cross-section for the chain link.

The transverse bars can preferably be connected to the side part by a positively locking and force-locking connection, in particular a snap connection.

In particular in that respect at least the connecting regions of the transverse bars are made entirely or predominantly from plastic. The transverse bars can predominantly or integrally comprise plastic and for example can be produced in the form of injection mouldings. That permits mechanically advantageous and long-lasting connection to the side parts of plastic. Transverse bars and side parts can be produced from the same plastic or at least with the same base polymer and possibly fibre-reinforced.

Such a fixing pin on the side parts can implement simple assembly of the transverse bars, for example by a proven robust latching or snap connection. That makes it possible for example with conventional transverse bars to connect the side parts and associated chain links to afford a chain link of box-shaped cross-section without using a tool. For that purpose the transverse bars are fixed only to the fixing pins of the side parts, that in particular project further inwardly than the projections on the side parts. That avoids increased expenditure and effort in respect of screw connections typical in relation to metal plates. If side parts are provided only at each second chain plate comprising the stronger material that provides a semi-constant structure with transverse bars only at each second chain link, and that reduces weight and costs.

Particularly preferably the transverse bars are at the same time used for laterally stable connection of the adjacent chain plates, in particular as a transverse securing means in respect of inner chain plates with respect to the adjoining outer chain plates or vice-versa. For that purpose the fixing pin of the side part can engage through a corresponding opening in the respectively associated chain plate and can project therethrough to the inward side. In a preferred development in that respect the corresponding opening in the side plate for the fixing pin is dimensioned in matching relationship or in conjugate relationship therewith so that the transverse bars can bear at the end against the edge of that opening. In that way the transverse bar can retain the associated chain plate in a lateral direction or transversely to the longitudinal direction of the energy guide chain on the respective side part. That permits particularly simple assembly of the chain lines without using a tool and with a few operating steps. Depending on the respective requirements the transverse bars at the end can have support regions which project or extend in the longitudinal direction in order to increase the contact surface at the chain plate. The chain overall, excluding the end connections, can be composed in the above-mentioned structure in particular from only three different parts, namely the chain plates, side parts and transverse bars, which can each be in the form of identical parts. That also avoids assembly errors and reduces the manufacturing complexity.

By using the transverse bars for laterally fixing the side part to the associated chain plate it is possible for the side part to be secured without additional connectors, in particular without connector elements of metal like for example screws, rivets, bolts, sleeves or the like. Such connector elements which are usual in the state of the art and which can come loose under vibration can be avoided in this case, whereby weight, as well as costs in respect of material and assembly are further reduced.

To increase the shape stability of the chain plates or for using chain plates of smaller wall thickness with the same maximum self-supporting length it is advantageous to provide a stiffening region which projects transversely or substantially perpendicularly to the main surface of the plate, at least at one or preferably both narrow sides of the chain plates. Such a stiffening region is advantageous in particular in relation to sheet metal plates, as a similar action to a carrier flange, and can be inexpensively produced by converting the flat basic shape, for example by sheet metal trimming, flanging over or the like. The stiffening region serves to stiffen the otherwise comparatively or completely flat chain plate. Depending on the respective plate contour, in relation to the longitudinal direction or as a side view, the stiffening regions can be of a straight or slightly curved configuration. The dimension in the longitudinal direction of the chain and perpendicularly to the main plane of the plate is preferably such that the stiffening regions do not come into contact with each other in both angular end positions.

The projections of the side parts, that are operative to provide the connection, are preferably so sized that they project with a dimension which is greater than or equal to double the plate thickness or material thickness of a chain plate in the overlap region. In that way the projections can engage completely through two chain plates which bear against each other or which overlap, possibly with a slight end protrusion. To avoid unwanted obstructive edges in the interior of the chain links the projections however should preferably project inwardly at a maximum with a dimension less than three times the plate thickness. A preferred dimension however is one with which the projections end flush at the inside of the inner or associated chain plate.

To enhance the lateral stability of the chain plate lines it is advantageous if there is provided in each end region or overlap region at at least one, at some or at each projection serving to limit the pivotal angle, at least one respective transverse extension, behind which the chain plate facing towards the side part can engage, that is to say the directly adjoining chain plate between the side part and the chain plate associated therewith. It is thus possible in that way to provide that the chain plate engages behind the transverse extension on the projection, at least when that chain plate is in a condition of abutment in a pivotal direction. That provides for an additional lateral holding action and occurs in particular when the chain plate with the corresponding end region of the through apertures bears against the respective abutment surface of the associated projections.

The associated preferably inner chain plate can already be retained laterally to the side part by way of transverse bars. Transverse extensions for providing lateral stability on the projections can thus be arranged in particular in such a way that the engagement therebehind is respectively effected by the two chain plates which overlap the associated chain plate. The latter are preferably respectively arranged as outer chain plates between the inner chain plate and the laterally outer side part. This means there is no need for the transverse extensions to project in the receiving space for the lines.

The chain plates are in operative engagement with the transverse extensions for lateral stabilisation, preferably in the straight position of the plate lines, that is to say in particular also in the self-supported run. It is also possible to provide such engagement behind transverse extensions of the abutment projections also or only for the completely angled pivotal position.

In addition or alternatively to such transverse extensions it is also possible to provide on the pin-like projections for affording the rotary joint connection, a securing means to prevent lateral displacement, like for example a latching connection, a snap connection or the like. By way of example snap hooks can be provided on the rotary joint projections, which preferably face towards the narrow sides or which are not around the flow of tensile/thrust forces. Suitable hinge pins with snap hooks or the like can desirably be implemented in the form of projections on the side part, using plastic injection moulding, possibly without modifying or processing the stiffer chain plates. A transverse securing action however can also be implemented as a kind of bayonet connection with the respectively adjoining chain plates.

In the production of the chain plates it can again be provided that at least one of the through apertures in each overlap region of the chain plate has edge regions which are operatively shaped to limit the pivotal angle and/or shaped edge regions serving to provide the rotary joint connection. In that way shearing forces or stresses on the projections of plastic can be distributed to an area which is larger in comparison with the cross-sectional area of the chain plates or the projections can be of a correspondingly material-saving configuration as the pressure in relation to surface area is reduced.

In operation the energy guide chain which is preferably displaceable in a plane typically forms a first run, a second run and therebetween a direction-changing region. In that case one run is fixed with an end region to an entrainment means of a relatively moveable connecting location, for example by means of special end connection parts.

A longitudinal portion which is of a hybrid configuration in accordance with the invention and in which successive chain plates with through apertures are provided in the first and in the second overlap region and a respective side part is associated with each second chain plate is intended to extend preferably from the end region at the entrainment means over at least a third of the total length of the energy guide chain. In that region the forces or loadings, in particular in the run which is self-supporting in ordinary operation, are at the highest or at the most critical in the extended state.

As an alternative to a configuration according to the invention only along a proportion of the length of the energy guide chain it will be appreciated, for simplification purposes, that both plate lines between their end regions can comprise continuously or preferably over substantially the entire length (excluding end regions or connecting parts) chain plates and side parts in accordance with the invention. In that case all chain plates and side parts are preferably structurally identical.

The invention also further concerns an individual chain link for an energy guide chain, which has two oppositely disposed chain plates of metal sheet with through apertures in the first overlap region and through apertures in the second overlap region. According to the invention provided laterally in relation to each of the oppositely disposed chain plates is a side part of plastic, which respectively has two end regions with at least one male projection which engages through a female aperture in the chain plate, for the purposes of limiting the pivotal angle and/or for making the joint connection. Preferably provided on the side part in each of its two end regions are a number of male elements or projections which correspond to the number of through apertures or female receiving means per overlap region of the chain plate so that a respective projection on each end region engages through an associated through aperture in the overlap region of the associated chain plate.

Such a hybrid chain link can then be connected to a further such hybrid chain link at both sides by only two respective individual chain plates (without a side part), that is to say only each second chain link has the proposed side parts. That chain link can otherwise comprise one or more of the above-described features.

As a core concept of the first aspect of the invention it can therefore be stipulated that a side part of plastic has in both end regions one or more male connector elements or projections which respectively engage at both overlap regions of an associated chain plate, through the through apertures or female receiving means both of the associated chain plate and also through those of a subsequent chain plate, in order to connect those plates together.

Thus a side part can overall connect together three successive plates. In that case the side part can engage through overlapping overlap regions of two successive chain plates in order to hingedly connect those chain plates and/or to limit the pivotal angle thereof. That permits a structure which is particularly simple to assemble, which saves on material and which possibly reduces the number of component parts, with a high level of mechanical strength for the chain plates, that is to say long self-supported lengths.

Therefore in particular each side part can serve to form two hinge connections or together with the corresponding chain plates can form two hinge connections between them. The one end region of the side part can in that case have the projection or projections for a first joint connection and the other end region of the side part can have the projection or projections for a further second joint connection. In that case each of those joint connections can be formed by the cooperation of three regions: an end region of the side part with projections, an overlap region with through apertures of a first chain plate or the chain plate with which the side part is associated, and an overlap region with through apertures in a second chain plate, wherein the projections respectively extend through the apertures in both chain plates. In each case precisely one side part is thus preferably associated with each second chain plate, wherein said one side part is a constituent part of both joint connections, with which the associated chain plate is hingedly connected to two adjacent chain plates.

Second Aspect (Securing Separating Web)

According to the second aspect which is independent of the above-mentioned first aspect there is proposed a separating web suitable for preventing unwanted detachment or separation of two oppositely disposed transverse bars or transverse members of a chain link. That separating web can advantageously be used in particular but not exclusively in an energy guide chain according to the first aspect.

Conventional transverse webs serve to divide up the internal space in chain links. They generally have at both ends a respective fixing region for fixing to a transverse bar of a chain link and are of a plate-like configuration extending in a main plane. As the fixing regions known separating webs typically have at least at one side a latching connection which can be produced and released by hand for fixing the separating web to the transverse bar. Known latching connections however are not sufficiently strong to provide for durable safeguard against unwanted detachment of the transverse bars.

DE 20 2015 101 707 U1 to the present applicant describes a multi-part separating web for fixing between two transverse bars. The parts of the separating web disclosed in DE 20 2015 101 707 U1 can be fitted into each other in the heightwise direction. To separate the parts from each other a transverse bar has to be opened or removed. KR 20 0 293 663 Y1 describes a two-part separating web, each of the two parts extending from one transverse bar to the other. Each part forms a half of the one fixing region and a half of the other fixing region for the respective transverse bar.

According to the second aspect there is to be proposed a separating web which permits a stronger connection which is suitable for providing the securing effect, with transverse bars in adjoining relationship at both sides. According to the second aspect that is already achieved in that the separating web is of a two-part configuration comprising a first part which includes at least one securing pin projecting perpendicularly to the main plane and a second part which includes at least one securing receiving means which is recessed perpendicularly to the main plane so that the two parts can be connected or released in a direction perpendicular to their main plane.

The proposed divisibility of the separating web into two parts perpendicularly to the longitudinal direction of the energy guide chain or the main plane of the separating web permits a stronger fixing to the transverse bar, which can be released only with difficulty or which cannot be released in operation. Transverse bars are typically connected approximately in the direction of the structural height of the chain link and approximately perpendicularly to the chain plates or side parts, for example by latching engagement. By virtue of the structure in accordance with the second aspect of the invention a connection between the separating web and the transverse bar, which reliably secures against release in that direction, can be provided, insofar as separation or removal of the transverse bar first becomes possible after the two-part separating web has first been opened or separated in a lateral direction (perpendicularly to the longitudinal direction or the connecting direction of the transverse bar). That makes it possible to achieve a reliable securing action which cannot be unintentionally released in operation as firstly separation of the two parts of the separating web is required. In that way the separating web, in addition to the usual function of dividing the internal space in the chain, can be used as a mechanical safeguard to secure the transverse bars on the chain link.

In preferred embodiments of the two-part separating web both parts can be in the form of identical parts and/or can each be made in one piece.

In that respect each part can be respectively designed with a fixing region and a body which on the one hand has a securing pin and on the other hand a securing receiving means. The securing pin is preferably arranged at an end region of the body, that is remote from the fixing region. Accordingly, in the connected state of the separating web, two respective securing pins can be fixed in a corresponding securing receiving means. Each of the two parts can have in particular precisely one fixing region. Preferably each fixing region is of a one-part configuration. That variant is particularly stable.

A particularly reliable safeguard against unintentional detachment of the transverse bars is achieved if each fixing region has an at least predominantly, preferably completely peripherally extending frame having an opening, through which the transverse bar can be introduced perpendicularly to the main plane.

To provide an additional safeguard against unwanted separation of the two parts of the separating web each part, at an end region opposite to the fixing region, can have at least one extension which projects in the main plane, in particular in the longitudinal direction of the energy guide chain. Such an extension makes it possible for the separating web parts to be secured together in a direction perpendicular to the main plane by means of the extensions, in particular by a screw connection, a securing pin or the like. An advantage of that configuration is that the additional securing means on the extensions is readily accessible from outside the chain link and even when lines are fitted therein.

Alternatively or in addition to provide the reliable connection between the two parts of the separating web, it can be provided that the securing pin is latchable to the securing receiving means. That can be achieved for example by the cooperation of a latching recess and a latching tongue or any other suitable latching or snap connection.

Accordingly, independently of the first aspect, the invention also concerns a separating web according to one of the foregoing embodiments. They are to be viewed independently as being respectively essential to the invention.

BRIEF DESCRIPTION OF THE DRAWINGS

Further features and advantages of the invention will be apparent without limitation on the scope of protection from the more detailed description hereinafter of preferred embodiments with reference to the accompanying Figures. In that respect the drawings show purely by way of example in relation to the first aspect:

FIGS. 2A-2D show a chain plate of high strength, according to the first embodiment, as a perspective view (FIG. 2A), a side view from the interior (FIG. 2B), a plan view (FIG. 2C) and as a side view from the exterior (FIG. 2D), FIGS. 3A-3D show a side part of plastic according to the first embodiment, as a perspective view (FIG. 3A), a side view from the interior (FIG. 3B), as a plan view (FIG. 3C) and as a side view from below (FIG. 3D)

Figure 1A:
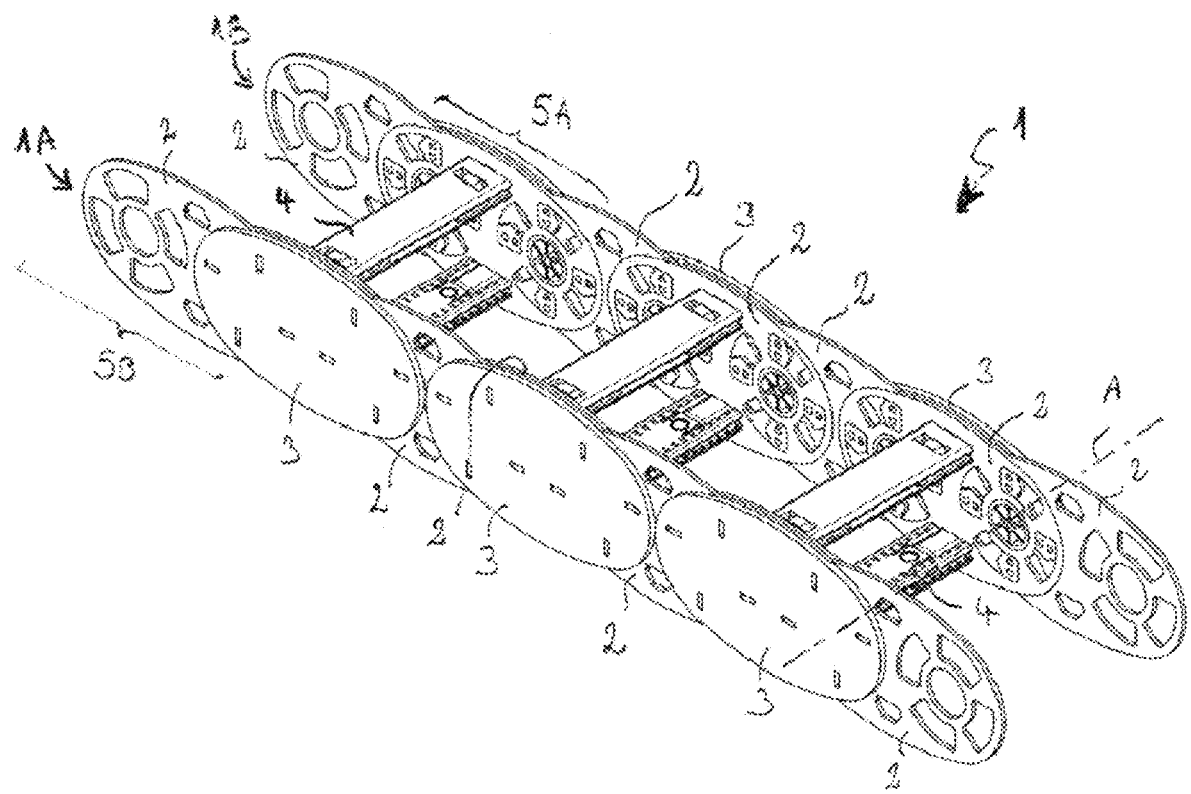
FIGS. 1A-1B show a straight longitudinal portion of a hybrid energy guide chain according to the invention in a first embodiment in the assembled state (FIG. 1A) and as a partially exploded view (FIG. 1B)

In addition the drawings show purely by way of example in relation to the independent second aspect:

FIG. 8A shows a chain link of an energy guide chain having a separating web according to a first embodiment, FIGS. 8B-8D show a separating web as shown in FIG. 8A as a perspective view (FIG. 8B), a sectional view of the separating web fixed to two transverse bars (FIG. 8C) and as a front view of the separating web (FIG. 8D), FIGS. 9A-9C show a perspective view (FIG. 9A) of a separating web according to a second embodiment, a sectional view of said separating web (FIG. 9A) fixed to two transverse bars, a detail view with securing pin as a sectional view (FIG. 9C), and FIG. 10 shows a perspective view of a separating web according to a third embodiment.

Figure 12A:
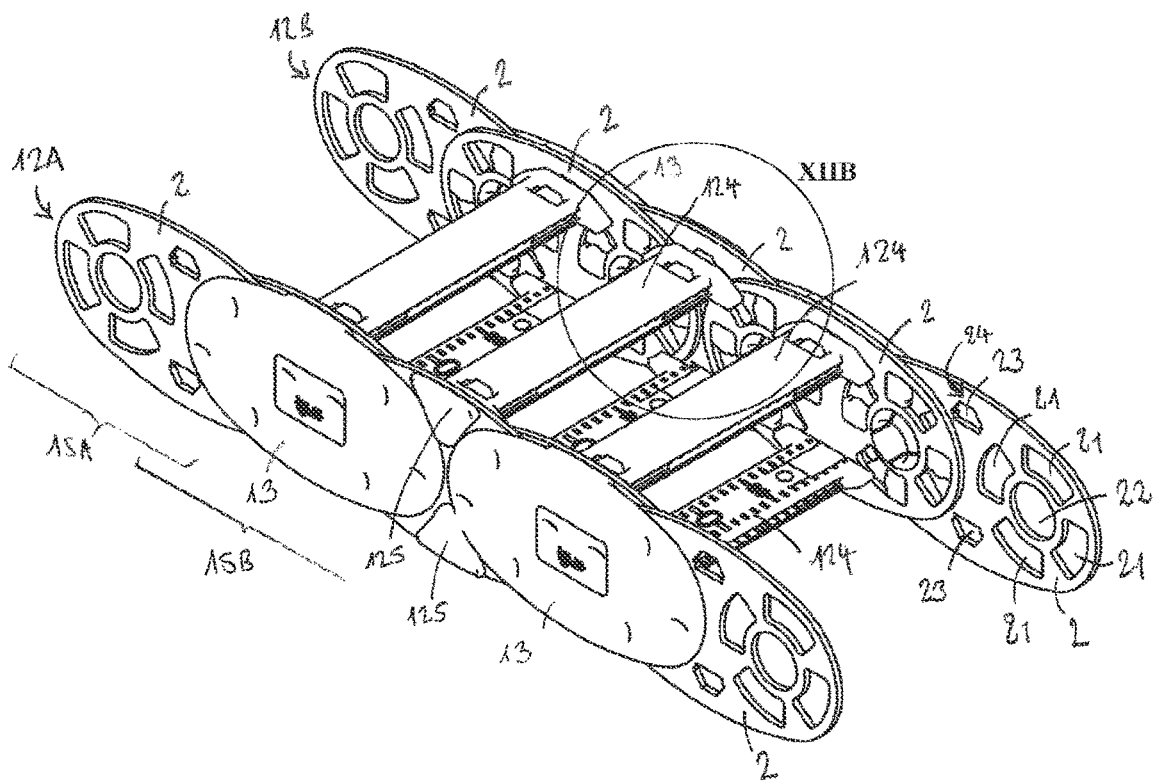
Figure 12C:
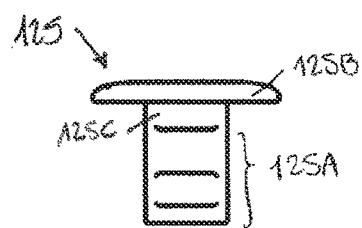
Figure 12D:
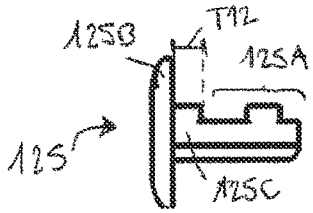
Figure 12B:
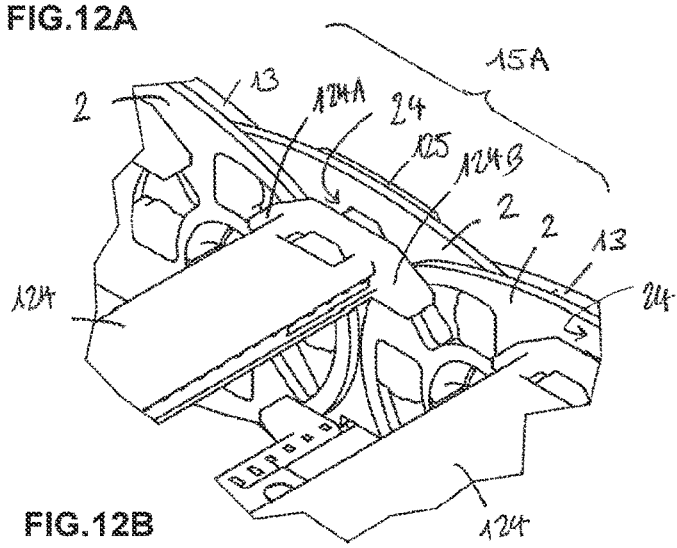
Figure 12E:
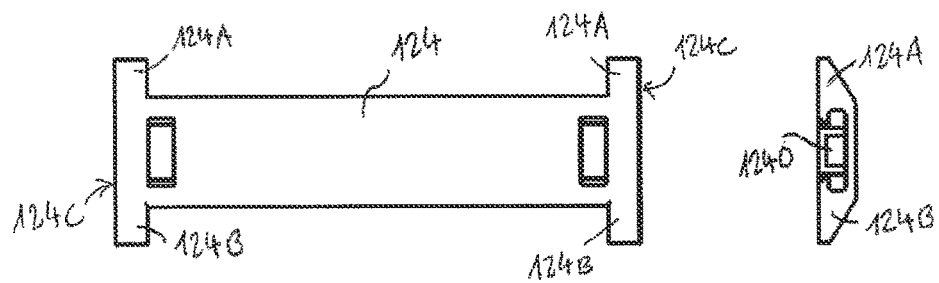
Figure 12F:
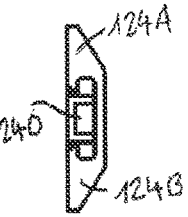

The drawing in turn shows the following as a variant in relation to the first aspect:

FIGS. 11A-11C show a side part of plastic according to a second embodiment, as a side view from the interior (FIG. 11A), a perspective view from the interior (FIG. 11B) and an enlarged partial cross-section (FIG. 11C) along section line XIC-XIC in FIG. 11A, and FIGS. 12A-12F show a partial portion of a hybrid energy guide chain according to the invention in a second embodiment, as a perspective view (FIG. 12A), as an enlarged partial view in relation thereto (FIG. 12B), illustrating a special connector for transverse bars as a plan view (FIG. 12C) and a side view (FIG. 12D) as well as a transverse bar of the energy guide chain as a plan view (FIG. 12E) and an end view (FIG. 12F).

DETAILED DESCRIPTION

Specific Description Relating to the First Aspect

Figure 1B:
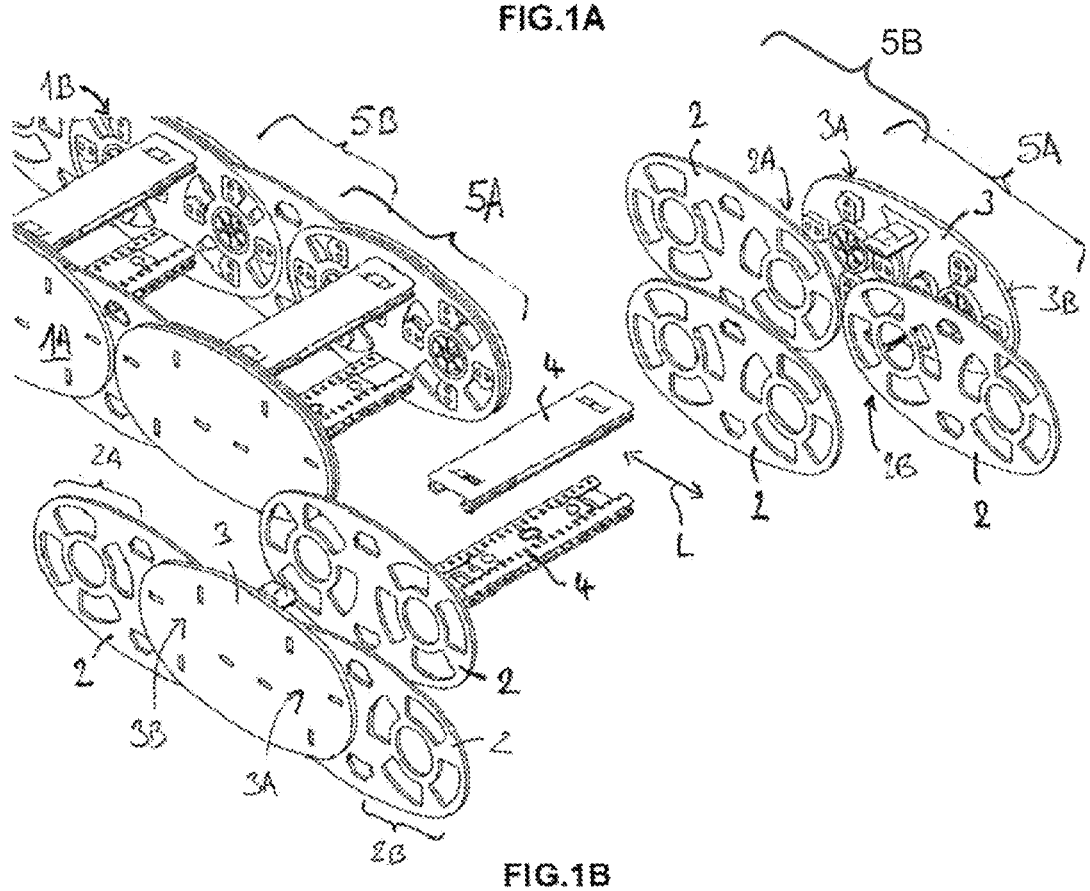

FIGS. 1A-1B show a longitudinal portion of an energy guide chain 1 having two laterally opposite plate lines 1A, 1B. Each plate line 1A, 1B is made up of two components, namely a chain plate 2 of metal, for example steel sheet, and a side part 3 of plastic, in particular produced by injection moulding. The two plate lines 1A, 1B are connected together in parallel relationship by pairs of transverse bars 4 and define therebetween a receiving space for supply lines (not shown). The transverse bars 4 which can be used on both sides are preferably made from plastic and are of a known configuration, as illustrated for example in DE 35 31 066 C2 or U.S. Pat. No. 4,813,224 A to the present applicant, the teaching of which is incorporated hereby.

The energy guide chain 1 is of a half-web structure and designed with chain links 5A and 5B respectively which are alternately of a different structure, namely with first hybrid chain links 5A comprising two chain plates 2, two side parts 3 and two transverse bars 4, and second simple or non-hybrid chain links 5B comprising only two chain plates 2. Successive chain links 5A, 5B are respectively hingedly connected together, more specifically pivotably relative to each other about a respective pivot axis A, from a pre-stressed or straight position of a run, as shown in part in FIGS. 1A-1B, into an angled position for forming a direction-changing arc (not shown) of a defined radius, and conversely when the energy guide chain 1 is reciprocated. The energy guide chain 1 can comprise continuously alternate chain links 5A and 5B as shown in FIG. 1A-1B between its end connections (not shown).

Inner and outer chain plates 2 alternate in each plate line 1A, 1B so that the chain plates 2 of metal respectively overlap in pairs, more specifically with a respective one of two end overlap regions 2A, 2B and the respective opposite overlap region 2A, 2B of the adjoining chain plate 1. The chain plates 2 of metal are accordingly arranged in the two plate lines 1A, 1B as alternate inner plates, here in the hybrid chain links 5A, and outer plates, here in the simple chain links 5B. In this case the chain plates 2 are of an identical structure in all chain links 5A, 5B, here being identical parts, as shown in detail in FIGS. 2A-2D.

In this arrangement a side part 3 of plastic is associated only with each second chain plate 2 of metal, here the inwardly disposed chain plate 2 in the chain links 5A. The chain links 5A thus use in hybrid relationship two materials, metal and plastic. The side parts 3 are identical parts of the same structure and produced using unitary material, in particular injection mouldings of plastic, and are shown in detail in FIGS. 3A-3D. In regard to the opposite chain plates 2 of a hybrid chain link 5A a respective special side part 3 is associated as a connecting shaped part in the chain links 5A and is mounted to the exterior (FIG. 1B). In each plate line 1A, 1B the two adjoining metallic chain plates 2 of a simple chain link 5B are respectively connected to the chain plate 2 of a hybrid chain link 5A by such a side part 3.

For that purpose the chain plates 2 in each overlap region 2A, 2B have four respective first through apertures 21, hereinafter referred to as the abutment through aperture 21, which serve for limiting the pivotal angle, and a respective second through aperture 22 which serves for hinged connection of the chain plates 2, here in the form of a rotary joint connection. In corresponding fashion therewith the connecting plastic part, that is to say the side part 3, in each of its end regions 3A, 3B, has four respective first projections 31, hereinafter referred to as abutment projections 31, for engaging through the abutment through apertures 21 in the chain plates 2. In addition the side part 3 has a second projection 32 for engagement into the second through aperture 22 of two chain plates 2 to be connected, which is of a configuration corresponding to the second through aperture 22.

All abutment through apertures 21 are of identical geometry in the form of a sector of a circular disc in the plate plane, see FIG. 2B and FIG. 2D respectively. In each overlap region 2A, 2B the abutment through apertures 21 are respectively distributed equally around the pivot axis A there of a chain link 5A, 5B. The arcuate dimension of the through apertures 21 can be selected to correspond to the desired pivotal angle, but is perceptibly smaller than 360°/d, with d being the number of abutment through apertures 21, here d=4, so that the ends of the chain plate 2 remain connected fixedly in respect of tensile force to the central region 2C thereof.

The abutment projections 31 of the side part 3, that cooperate with the abutment through apertures 21, are shaped in the form of block-shaped elements which are also identical, here with an approximately square or rectangular base surface, see FIG. 3B. Each abutment projection 31 has two abutment surfaces 31A, 31B facing away from each other at its long sides. The abutment surfaces 31A, 31B serve for limiting the pivotal angle by abutment with a respective one of two straight or linearly extending end regions 21A, 21B at the end of each arcuate abutment through aperture 21. The end regions 21A, 21B here extend parallel to a radius of the pivot axis A, but displaced by about half the spacing between two abutment surfaces 31A, 31B relative to the radius, see FIG. 2B.

As FIGS. 2B-3B and FIGS. 3D-3D show the chain plates 2 and the side plates 3 respectively have main bodies 20 and 30 respectively, with congruent external contours in a side view, here being oval or approximately eliptical with the long axis in the longitudinal direction L of the chain links (=connecting line between the pivot axes A-A of a chain plate 2). As FIG. 2A shows the main body 20 or the chain plate 2 is respectively in the form of a flat component without a cranked configuration or an offset at both main sides. The chain plates 2 are of a plate thickness T2 which is constant over the entire surface. As FIG. 3C shows the side parts 3 have respective projections 31, 32 only at a main side which is mounted facing the inward side of the hybrid chain link 5A, and are of a flat or projection-free configuration at the other main side or outward side.

As can best be seen from FIG. 1B a side part 3 with protruding projections 31, 32 is associated only with each second chain plate 2, that is to say in the chain links 5A. In the straight position the end regions 21B in the one overlap region 2A of the associated chain plate 2 are in abutment with the abutment projections 31, namely the abutment surfaces 31B, whereas in the other overlap region 2B of that chain plate 2 the respective other end regions 21A of the abutment through apertures 21 are in a state of abutment with the respective other abutment surface 31A of the abutment projections 31. For the adjacent chain plates 2 in respectively reversed relationship the opposite end regions 21A and 21B respectively are in a state of abutment with the corresponding abutment surface 31A and 31B respectively. As can be seen from FIG. 1A the projections 31 are thus clamped between the respective oppositely disposed end regions 21A, 21B of the chain plates. Accordingly the limitation in respect of the relative pivotal position is achieved on the one hand in the straight position (FIG. 1A) and correspondingly also on the other hand, by the respectively reversed end regions 21A and 21B in the completely angled position (not shown). The plastic of the abutment projections 31 can well carry corresponding pressure loadings. In order to carry the shearing action between two radially opposite end regions 21A and 21B respectively the abutment projections 31 are at least region-wise designed continuously from solid material between the abutment surfaces 31A and 31B, in FIGS. 3A-3D for example with three solid regions, and with a spacing between the abutment surfaces 31A and 31B of a dimension which is a multiple of the plate thickness T2 of the chain plates, for example by a factor of at least 5.

Accordingly only through apertures 21, 22 (female connectors) are provided in the two overlap regions 2A, 2B and only projections 31, 32 (male connectors) are provided at the side parts 3, to make the connection at the chain plates 2. The chain plates 2 shown in FIGS. 2A-2D can thus desirably be produced in the form of simple sheet components, for example by stamping out or cutting machining, possibly without further processing or shaping steps. The chain plates 2 have a level monolithic main body 20 which is flat at both sides. The side parts 3 are produced from a plastic in one piece, with the main body 30 and all projections, in particular the projections 31, 32. The chain plates 2 and the side parts 3 are respectively of a symmetrical configuration relative to a central axis of symmetry S, perpendicular to the longitudinal direction.

Accordingly identical chain plates 2 and side parts 3 can be used at both sides in any plate line 1A, 1B.

To provide a stable rotary joint connection and to provide for tensile/thrust force transmission the side part 3 in each end region 3A, 3B has a respective joint projection 32 with a circular-cylindrical outside wall defining the pivot axis A. The joint projection 32 can be designed as shown in FIGS. 3A-3B for example in the form of a ring with a reinforcing hub for saving on material. Each joint projection 32 engages through and supports a respective coaxial circular through aperture 22 in the laterally overlapping overlap regions 2A, 2B of the associated chain plate 2 and the adjoining chain plate 2 which respectively overlaps same there, see FIG. 1B. Thus in spite of the simplest structure for the chain plates 2 a robust rotary joint connection between successive chain plates 2 about the pivot axis A is achieved. As a comparison of FIG. 1A with FIG. 3B shows three projections, namely two abutment projections 31 and a joint projection 32, respectively engage into each overlap region 2A, 2B of the chain plate on the long central axis in the longitudinal direction L, engaging into the corresponding through apertures 21, 22 so that in spite of the side parts 3 being of a structure which saves on material, upon displacement of the energy guide chain high tensile and thrust forces can be transmitted from the one chain plate 2 through the projections 21, 22 directly to the following chain plate 2. In that arrangement tensile and thrust forces can be transmitted in part by the abutment projections 31 or, in the case of a suitably set clearance, exclusively the joint projections 32 of the side plates 3, as between the through apertures 22 and the chain plate 2. Accordingly only those projections 31 and 32 have to be made from plastic to be correspondingly sufficiently strong and of a suitable size. A flow of force by way of the main body 30 of the side parts 3 does not occur at any event so that the main body 30 is of a comparatively thin-walled structure.

For fixing two respective side parts 3 and two associated overlapped side plates 2 to provide a hybrid chain link 5A the transverse bars 4 are respectively connected at their ends to one of two oppositely disposed fixing pins 8 in the central region 3C of the side parts 3. Each fixing pin 8 is produced in one piece with the main body 30 and, like the projections 31, 32, projects at the inside therefrom. For stiffening purposes in the central region 3C between the end regions 3A, 3B the main body 30 has a material thickening 7, at which the fixing pins 8 are respectively provided comprising a uniform material therewith. The material thickening 7 in the central region 36 can involve a thickness of about the plate thickness T2 of the chain plates 2, preferably slightly larger, and is shaped at the end to correspond to the contour thereof. Each fixing pin 8 is provided near the two long narrow sides 9A, 9B of the side part 3, which are approximately in the longitudinal direction L.

The fixing pin 8 is of an approximately hexagonal cross-section and has a projecting transverse nose which engages into a receiving means on the transverse bar 4 for locking perpendicularly to the main plane of the side parts 3. The transverse bars 4 are fitted approximately perpendicularly to the pivot axes A and the longitudinal direction L on the fixing pins. For that purpose the transverse bars 4 at the ends have receiving means for a stable snap connection to the fixing pins 8, as described in DE 35 31 066 C2, with the difference that the fixing pin 8 projects further by approximately double the plate thickness T2 of the chain plates 2. More specifically the fixing pins 8 engage through a further opening 23 at each narrow side 6A, 6B of the associated chain plate 2. A respective adjoining chain plate 2 is also held between each overlap region 2A, 2B of the associated chain plate 2 and the side part 3, see FIGS. 1A-1B. Securing of the chain plates 2 to each other perpendicularly to the longitudinal direction L or the main plane S-L can be achieved by the transverse bars 4 which respectively bear at the ends with their flat ends against the edge 24 around the opening 23 in the associated chain plate 2 in order to hold that chain plate 2 in the lateral direction inwardly on the side part 3. Between the opposite overlap regions 2A, 2B of that chain plate 2 and the end regions 3A, 3B of the side part 3, the adjoining chain plates 2 of the non-hybrid chain links 5B are held there at the same time. Fitting two transverse bars 4 thus fits, at the same time with the chain link 5A, three respective chain plates 2 to each other transversely to the longitudinal direction L, see FIG. 1B. In the assembled state the associated chain plate 2 is clamped by suitable dimensioning of the fixing pins 8 between the transverse bars and the material thickening 7 of the side part 3, that is to say the outward side of the chain plate 2 is biased against the flat inward side of the material thickening 7.

To provide for additional securing to prevent the end regions 3A, 3B from bending open in the simple chain links 5B all abutment projections 31 have a respective transverse extension 35 which has engaging therebehind the respectively adjoining chain plate 2, more precisely the edge of the main body 30 at the respective end region 21A, 21B. As can be seen in FIG. 1A, that engagement of the transverse extensions 35 at the abutment projections 31 for lateral stabilisation is effected here only in the more critical straight position of the plate lines 1A, 1B, that is to say in particular in the self-supporting upper run when the chain links 5A, 5B are not angled. The transverse extensions 35 can be of any suitable configuration, here for example in the form of semicircular tongues as viewed in a side view (FIGS. 3A-3B), which project from the end of the block-like abutment projections 31 parallel to the main plane L-S of the side part 3. The spacing between the transverse extensions 35 and the main body 30 is slightly greater than the plate thickness T2 of the chain plates 2. To simplify the shaping tool used for production of the side parts 3 by injection moulding a production recess 36 can be provided in relation to each transverse extensions 35 in the plate body 30 so that no slide member is required in the shaping tool.

FIGS. 4A-6C show variants in relation to the metallic chain plate 2 of FIGS. 2A-2D for the construction of hybrid chain links 5A in conjunction with side parts 3. Only the differences are described hereinafter, other features in the side plates 42, 52, 62 are identical to those described with reference to FIGS. 2A-2D.

Figure 4A:
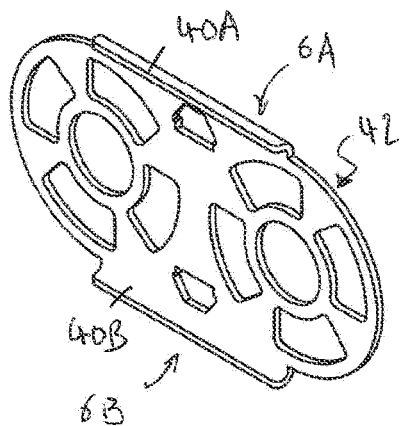
FIGS. 4A-4C show a first variant of the chain plate shown in FIGS. 2A-2D as a perspective view from the interior (FIG. 4A), as a front view (FIG. 4B) and as a perspective view from the exterior (FIG. 4C)
Figure 4B:
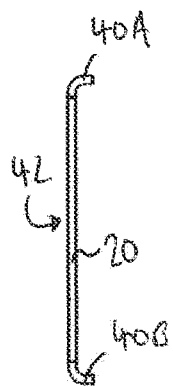
Figure 4C:
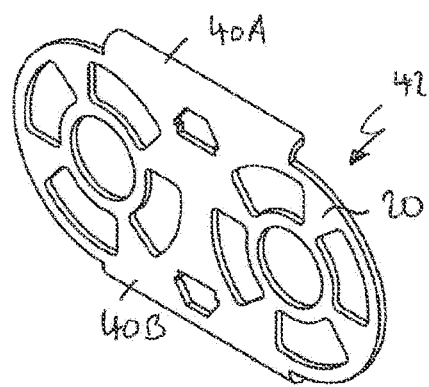

Referring to FIGS. 4A-4C the chain plate 42 has a respective end stiffening region 40A, 40B at both narrow sides 6A, 6B to stiffen the main body 20 to prevent unwanted deformation, in particular in the event of very long self-supporting lengths. The stiffening regions 40A, 40B extend approximately linearly in the longitudinal direction L and are curved in cross-section approximately corresponding to a quarter-circle arc, that is to say they can be shaped by flanging projecting end plates from the otherwise flat main body 20. The length of the stiffening regions 40A, 40B here extends somewhat beyond the chain pitch division, that is to say the spacing between successive pivot axes A. Chain plates 42 with a stiffening region 40A, 40B at each narrow side 6A, 6B can possibly be used turned through 180° about their longitudinal axis for different prestressing effects.

Figure 5A:
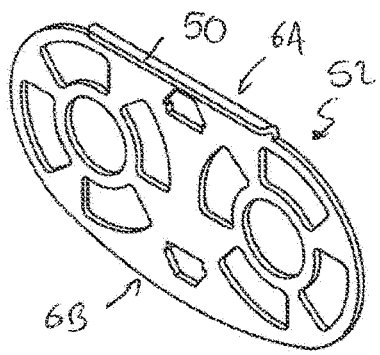
FIGS. 5A-5C show a second variant of the chain plate shown in FIGS. 2A-2D as a perspective view from the interior (FIG. 5A), as a front view (FIG. 5B) and as a perspective view from the exterior (FIG. 5C)
Figure 5B:
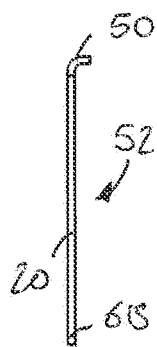
Figure 5C:
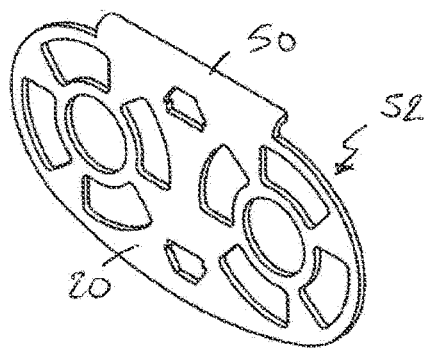

In FIGS. 5A-5C the chain plate 52 has a respective stiffening region 50, corresponding to the configuration shown in FIGS. 4A-4C, only at one narrow side 6A, namely the narrow side upward in the self-supporting run. The other narrow side 6B in contrast is of an oval configuration and is in level-plane relationship with the main body 20, as in FIGS. 2A-2D.

Figure 6A:
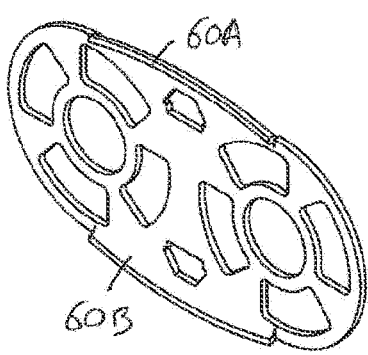
FIGS. 6A-6C shows a third variant of the chain plate shown in FIGS. 2A-2D as a perspective view from the interior (FIG. 6A), as a front view (FIG. 6B) and as a perspective view from the exterior (FIG. 6C)
Figure 6B:
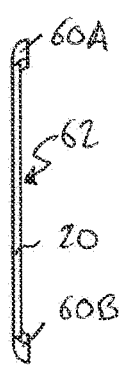
Figure 6C:
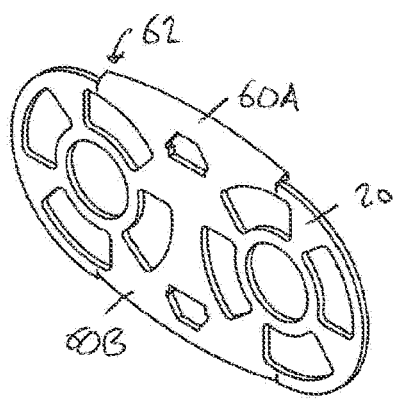

In FIGS. 6A-6C the chain plate 62 again has at both narrow sides 6A, 6B, a respective end stiffening region 60A, 60B for stiffening the main body 20 to prevent unwanted deformation. In this case the cross-section is as in FIG. 4C, but the configuration is slightly curved in the longitudinal direction L, matching the oval contour of the side parts 3. The respective plate projecting at the narrow side 6A, 6B can possibly be cut into at its ends in order not to adversely affect the main body 20 upon deformation, as can be seen in FIGS. 6A/6C. Chain plates 42, 52, 62 shown in FIGS. 4A-6C allow a further increase in the self-supporting length with the plate thickness T2 remaining the same. They are arranged alternately facing away from each other with the stiffening regions 40, 50, 60 so that they do not adversely affect the angular positioning.

Figure 7A:
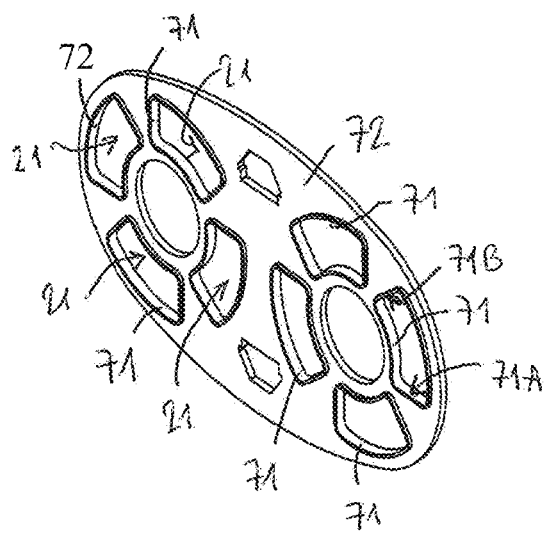
FIGS. 7A-7C show a perspective view of a chain plate or a side part of a further embodiment, individually from the interior (FIG. 7A and FIG. 7B respectively) and in the form of a connectable group (FIG. 7C)
Figure 7B:
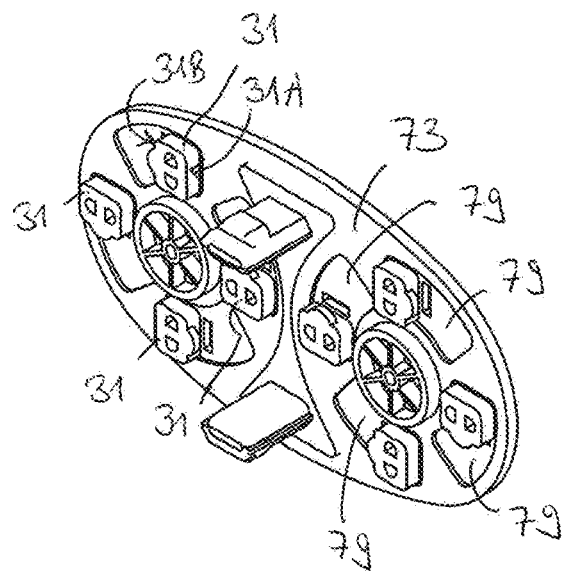
Figure 7C:
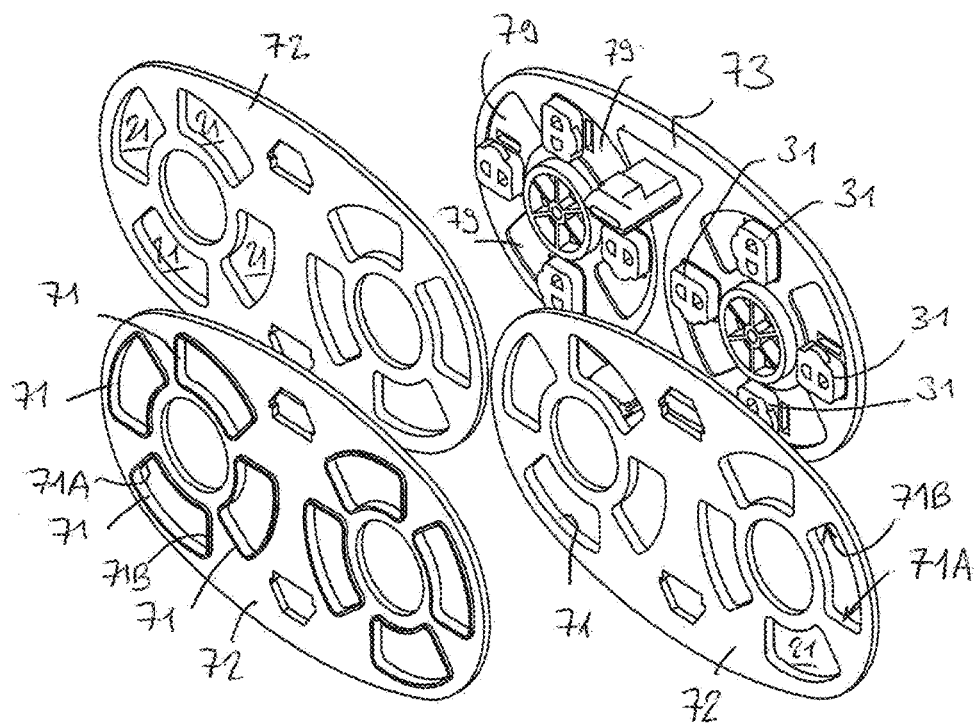

FIGS. 7A-7C show a further variant of the metallic chain plate 2 from FIGS. 2A-2D and a variant in respect of the side part 3 from FIGS. 3A-3D. Only the differences are described hereinafter, other features are identical to those described with reference to FIGS. 2A-2D and FIGS. 3A-3D.

The chain plates 72 of metal in FIGS. 7A/7C have respective peripherally extending edge regions 71 at all abutment through apertures 21 of each overlap region 2A, 2B, the edge regions 71 being produced by metal shaping, for example deep drawing or flanging. Those edge regions 71 include end regions 71A, 71B operative as abutments, with an abutment surface which is increased in comparison with FIG. 2A-2D and which is produced by shaping. Accordingly the surface pressure can be respectively better distributed on abutment surfaces 31A, 31B of the abutment projections 31 on the side part 73 of plastic. The shaping operation also inherently avoids sharp edges at the through apertures 21. In addition peripherally extending edge regions 71 act as a stiffening for the chain plate 72.

As FIG. 7C shows the structurally identical chain plates 72 are linked alternately in rotated relationship by the side parts 73, with the projecting edge regions 71 directed inwardly and outwardly as shown in FIG. 7C. In a corresponding fashion arcuate depressions 79 are provided in the side part 73 for the edge regions 71 of the overlapping chain plates 72. The protrusion of the edge regions 71 is perceptibly less than that of the projections 31 of the side part 73. All other features of the chain plates 72 and side parts 73 correspond to the first embodiment.

FIGS. 11A-11C show a development of a side part 13 for use in a hybrid energy guide chain 1. The side part 13, corresponding to that in FIGS. 3A-3D, also has here a main body 30 with two end regions 3A, 3B and therebetween a central region 13C which is reinforced by a material thickening 7 and which includes a fixing pin 8 for a transverse bar, near each narrow side 9A-9B. Provided in the end regions 3A, 3B are four respective abutment projections 131 for engagement into corresponding through apertures 21 of two adjoining chain plates 2, for the purposes of limiting the pivotal angle. Each abutment projection 131 has a transverse extension 35 for lateral stability in the straight position. The side part 13 is also produced in one piece from plastic by injection moulding and is intended and can be used for connecting two overlapping chain plates 2 as shown in FIGS. 2A-2D.

The essential difference in FIGS. 11A-11C in comparison with FIGS. 3A-3D is described hereinafter. In FIGS. 11A-11C each pin-like second projection 132 for providing the joint connection at the same time has a latching snap connector for latching to the chain plate 2 (see FIGS. 12A-12B), namely a respective second through aperture 22 which serves as a pin receiving means or joint receiving means. The side part 13 thus further enhances the lateral stability of the plate lines 1A, 1B or chain links 5A, 5B by latching connection at the joint connection, in particular in all angular positions of the chain plates 2 relative to each other. For that purpose, at the projecting inward side, the joint projection 132 has at least two diametrally opposite latching noses 132A, 132B with corresponding latching edges, as FIG. 11C shows in greater detail. In the example shown in FIGS. 11A-11C the joint projection 132 respectively forms four latching noses 132A, 132B in the form of a quarter-circle arc which is shaped in one piece with the base in the shape of a circular arc of the joint projection 132 and are distributed symmetrically around the pivot axis A. As an alternative thereto for example it is also possible for only two latching noses or latching hooks to be in mutually opposite relationship, for example in the heightwise direction (perpendicularly to the longitudinal direction L), diametrally relative to the pivot axis A, so that regions directed in the longitudinal direction L of the joint projection 132 can be of a flexurally firm configuration, similarly to FIGS. 3A-3D. Joint projections 132 shown in FIGS. 11A-11C which at the same time have a latching function can advantageously be manufactured by injection moulding.

FIGS. 12A-12F show a development of an energy guide chain 12 having two opposite plate lines 12A, 12B. Each plate line 12A, 12B is made up of alternate chain plates 2 overlapping at one side as shown in FIGS. 2A-2D and with side parts 13 as shown in FIGS. 11A-11C. In this case, provided both at chain links 15B with side parts 13 and also at chain links 15A with only two chain plates 2 (without side parts 13) are two respective special transverse bars 124 which provide for additional lateral stabilisation.

As can be seen from FIGS. 12A-12B and FIGS. 12E-12F the transverse bars 124 in this arrangement are provided at both ends with two respective oppositely disposed extensions or wings 124A, 124B which project in the longitudinal direction L and which are symmetrical relative to the longitudinal central plane of the transverse bar 123. The flat outside surfaces of the wings 124A, 124B are flush with the respective end of the transverse bar 124. As can be seen from FIGS. 12A and 12B the wings 124A, 124B with their outside surfaces form a respective support surface 124C which in the simple chain links 15A inwardly overlaps the respective two adjoining chain plates 2 of the adjacent hybrid chain links 15B and supports same laterally inwardly, that is to say increases lateral stability. In the hybrid chain links 158 the edge region 24 of the chain plate 2 around the openings 23 for the fixing pins 8 of the side parts 13 bears stably against the support surfaces 124C of the wings 124A, 124B to increase lateral stability. In the hybrid chain links 15B the transverse bar 124 is fixed to the fixing pins 8 of the side plates 13 which respectively engage through the corresponding opening 23 in the chain plate 2.

The energy guide chain 12 in FIGS. 12A-12F is of a full-web configuration, that is to say with transverse bars 124 at the hybrid chain links 15B and also at the non-hybrid chain links 15A (see FIG. 12B). In that respect FIGS. 12C-12D show a special connector 125 in the form of an injection moulding, with which the transverse bars 124 can be fixed to the individual chain plates 2. The separate special connector 125 has a fixing end 125A, whose shape, in particular whose cross-section, is structurally identical to the fixing pins 8 for latching to a receiving means 124D of the transverse bar 124 in known manner (see FIGS. 11A and 3B). In opposite relationship the special connector 125 forms a support end 125B of enlarged cross-section, here approximately of a triangular shape, for bearing against the outside of the chain plate 2, in each case at the outer edge around the opening 23. Between the fixing end 125A and the support end 125B there is a transition 125C, the cross-section of which is of a conjugate matching relationship with that of the opening 23 in the chain plate 2, for the purposes of preventing rotation, and which forms a contact edge for the end of the transverse bar 124. The dimension T12 of the transition 125C perpendicularly to the plane of the plate can in this case be slightly smaller than the plate thickness T2 of the chain plate 2 in order to provide for play-free contact of the inside surfaces of adjacent chain plates 2 against the support surfaces 124C of the wings 124A, 124B. By means of the special connectors 125 it is possible to implement a full-web energy guide chain 12 as shown in FIGS. 12A-12F without male connector components on the chain plates 2.

Other features and properties of the hybrid energy guide chain 12 shown in FIGS. 11A-12F correspond to those of the hybrid energy guide chain 1 in FIGS. 1A-3D.

An energy guide chain or a chain link according to one of the foregoing embodiments can advantageously be supplemented by a separating web as described hereinafter.

Specific Description Relating to the Second Aspect

FIG. 8a shows a chain link 801 of an energy guide chain having two chain plates or side parts 802 of per se known structure. The side parts 802 are connected together and spaced from each other by two transverse bars 803. The side parts 802 and the transverse bars 803 define a receiving space 804 in the chain link 801 for receiving supply lines (not shown) which are guided by the energy guide chain. In the illustrated example the receiving space is divided vertically in two by a separating web 805. In this case the separating web 805 is of a plate-like configuration and is fixed at each of its end sides to a respective one of the transverse bars 803. For that purpose the separating web 805 has a respective fixing region 806 at its ends. The fixing regions 806 are here identical.

In accordance with the second aspect of the invention the separating web 805 is of a two-part structure. In all embodiments shown in relation to the second aspect the separating web 805, 905, 1005 is composed of two identical parts, namely the parts 807, 907, 1007 which are preferably produced in one piece from plastic in the form of an injection moulding. The two parts 807, 907, 1007 are releasably connected together here.

The part 807 is shown individually in FIGS. 8b and 8d. Each of the two individual parts 807 of a separating web 805 is of a plate-like configuration with a main plane corresponding to the plane of the drawing in FIG. 8d. The width direction B and the heightwise direction H perpendicularly thereto of the separating web 805 per se are disposed in the main plane. The width direction B, in the installed state of the separating web 805, corresponds to the longitudinal direction of the chain link 801 or the guided lines. The heightwise direction H corresponds to the direction from one fixing region 806 to the other perpendicularly to the transverse bars 803 and the longitudinal direction of the chain link 801.

In FIGS. 8a-d the fixing region 806 is in the form of a peripherally extending frame 814 having an opening 816. The opening 816 serves to receive a respective transverse bar 803 which can be introduced through that opening 816 perpendicularly to the main plane. The embodiment in FIG. 10 also has such a frame 1014 as the fixing region 1006. The frame 814, 1014 can particularly reliably prevent unwanted detachment or release of the transverse bar. The frame 814, 1014 however does not necessarily have to be of a completely peripherally extending configuration but for example can also be in the form of a C-shaped clamp which partially and preferably predominantly embraces the remote outward side of the transverse bar 803.

Each of the parts 807 in FIGS. 8a-d has a respective end fixing region 806 and a tongue-like body 808. Each two parts 807 can be connected together and are releasable from each other in a direction perpendicular to the main plane. To assemble a separating web 805 from the two parts 807 the parts 807 are placed together in such a way that their bodies 808 overlap in the main plane. The common wall thickness of the two bodies 808 in that region preferably corresponds to the thickness of the respective fixing region 806. This therefore provides for flat outward sides which do not have any abrupt change in level without disruptive edges. Each part 807 has precisely one fixing region 806.

The body 808 has a circular-cylindrical securing pin 810 projecting perpendicularly to the main plane B-H and a circular-cylindrical securing receiving means 812 which is recessed perpendicularly to the main plane B-H. The securing pin 810 is arranged at an end region of the body 808, remote from the fixing region 806. The securing pin 812 is arranged between the fixing region 806 and the securing pin 810, with respect to the heightwise direction H. The securing pin 810 and the securing receiving means 812 are spaced from each other in the heightwise direction H. In all embodiments shown here the securing receiving means 812, 912, 1012 is in the form of a through hole. The securing pin 810 and the securing receiving means 812 are arranged with respect to the width direction B on a line forming an axis of symmetry S of the part 807. The part 807 is thus of mirror-image symmetrical configuration relative to the axis of symmetry S in the main plane perpendicularly to the width direction B. When two parts 807 are connected together to provide a separating web 805 the securing pin 810 is received in the securing receiving means 812 and terminates flush with the surface of the other part 807 that is towards the securing pin 810 of the one part 807.

Asymmetric parts are also basically in accordance with the invention as long as outside contours of the securing pin 810 and the securing receiving means 812 are of a mutually matching configuration and arrangement, for example symmetrically with respect to an axis of symmetry Z of the pair of securing pin/securing receiving means, that extends perpendicularly to the height direction H in the main plane. The securing pin 810 and the securing receiving means 812 are preferably but not necessarily of a circular-cylindrical or cylindrical configuration. The securing pin 810 and the securing receiving means 812 can each be of a cross-section parallel to the main plane, that changes in a direction perpendicular to the main plane. The securing pin 810 is always of a complementary configuration to the securing receiving means 812 for a positively locking and/or force-locking connection.

FIG. 9c shows a partial view of a cross-section of the separating web 905, wherein the securing pin 910 is latched to the securing receiving means 912 by cooperation of a latching tongue 918 and a latching recess 920. A structure having a latching connection is preferred for all embodiments. FIG. 8b shows for example the preferably continuously peripherally extending latching tongue 818 on the securing pin 810 and the preferably cylindrical latching recess 820 in the securing receiving means 812.

Each part 807 shown in FIGS. 8a-8d has two extensions 817 projecting in the width direction B. Each extension 817 has a connecting hole 819. The connecting hole 819 has an axis in the main plane. When the two parts 807 are connected two respective connecting holes 819 are aligned with each other. The two parts 807 can thus be secured together by means of the extensions 817 in a direction perpendicular to the main plane, for example with screws, securing pins or the like, which are fitted into the connecting holes 819 and secure the arrangement perpendicularly to the main plane. The extensions 817 are preferably arranged at one side of the axis of symmetry Z of the pair securing pin/securing receiving means with respect to the heightwise direction H. In the embodiments shown in FIGS. 8a,b,d and FIGS. 9a,9b the extensions 817, 917 terminate flush with the axis Z.

The part 807 can optionally have an additional through opening 821 which is equidistant on the axis of symmetry S between the securing pin 810 and the securing receiving means 812. When two parts 807 are connected to provide a separating web 805 those through openings 821 are also aligned with each other as can best be seen from FIG. 8c. They can also be used for an additional securing action, for example if no extensions are wanted.

FIGS. 9a,b and FIG. 10 show further embodiments of structurally identical parts 907, 1007 of a separating web. Only the differences in relation to these modifications in the part 807 in FIGS. 8a-d are described, all other features are identical or correspond to those described with reference to FIGS. 8a-d.

The part 907 in FIGS. 9*a,b* differs from the part 807 only in the shape of the fixing region. The fixing region 906 is here in the form of a holding clamp 922. The holding clamp 922 serves for latchingly engaging into a latching bar, in the form of a depression, in a transverse bar (not shown). For that purpose there are mutually opposite latching hooks 924. The latching hooks 924 of the holding clamps 922 which extend relative to each other in the width direction of the part 907 can be latched to the latching bar 826, 926 of the transverse bar 803, 903 and are more stable and stronger than usual latching connections.

The part 1007 in FIG. 10 differs from the part 807 in FIGS. 8*a*-8*d* only in that it does have any extensions 817. The two parts 807, 907, 1007 in FIGS. 8*a* to 10 are respectively held by the latching connection of a latching tongue 106 with a latching recess 1020 on the securing pin 810, 1010 and securing receiving means 812, 1012. The through openings 1021 between the securing pin 1010 and the securing receiving means 1012 can be used for an additional securing action, for example by means of a bolt or the like.

The proposed separating web 805, 905, 1005 allows reliable securing of the transverse bars to the chain plates so that they can only be separated off in the heightwise direction H after the two parts 807, 907, 1007 have been separated from each other in the perpendicular direction to the longitudinal direction and the heightwise direction.

LIST OF REFERENCES

FIG. 1A-FIG. 3D

- 1 energy guide chain
- 1A, 1B plate line
- 2 chain plate
- 2A, 2B overlap region (chain plate)
- 2C central region (chain plate)
- 3 side part
- 3A, 3B end region (side part)
- 3C central region (side part)
- 4 transverse bar
- 5A, 5B chain link
- 6A, 6B narrow sides (chain plate)
- 7 material thickening
- 8 fixing pin
- 9A, 9B narrow sides (side part)
- 20 main body (chain plate)
- 21 first through aperture (abutment apertures)
- 21A, 21B end region (abutments)
- 22 second through aperture (pin receiving means)
- 23 opening
- 24 edge
- 30 main body (side part)
- 31 first projection (abutment projections)
- 31A, 31B abutment surface
- 32 second projection (pin projections)
- 35 transverse extension
- 36 tool opening
- A pivot axis
- L longitudinal direction
- S axis of symmetry
- T2 plate thickness

FIG. 4A-FIG. 6C

- 6A, 6B narrow sides (chain plate)
- 20 main body (chain plate)
- 42, 52, 62 chain plate
- 40A, 40B, 50, 60A, 60B stiffening region

FIG. 7A-FIG. 7C

- 21 abutment apertures
- 71 edge region
- 71A, 71B end region (abutments)
- 72 chain plate
- 73 side part
- 79 depressions

FIG. 8A-FIG. 10

- 801 chain link
- 802 side part
- 803, 903 transverse bar
- 804 receiving space in the chain link
- 805, 905 separating web
- 806, 906, 1006 fixing region
- 807, 907, 1007 part for assembly of a separating web
- 808, 908, 1008 body of the part
- 810, 910, 1010 securing pin
- 812, 912, 1012 securing receiving means
- 814, 1014 frame
- 816, 1016 opening
- 817, 917 extension
- 818, 918, 1018 latching tongue
- 819, 919 connecting hole
- 820, 920, 1020 latching recess
- 821, 921, 1021 through opening
- 922 holding clamp
- 924 latching hook
- 826, 926 latching bar on the transverse bar
- B width direction
- H heightwise direction
- S, Z axes of symmetry

FIG. 11A-FIG. 12F

- 2 chain plate
- 5A, 5B chain link
- 7 material thickening
- 8 fixing pin
- 9A, 9B narrow sides (side part)
- 12 energy guide chain
- 12A, 12B plate line
- 13 side part
- 13A, 13B end region (side part)
- 13C central region (side part)
- 15A, 15B chain link
- 21 first through aperture (abutment apertures)
- 22 second through aperture (pin receiving means)
- 23 opening
- 24 edge
- 30 main body (side part)
- 35 transverse extension
- 124 transverse bar
- 124A, 124B wing
- 124C support surface
- 125 special connector (for transverse bars)
- 125A fixing end
- 125B support end
- 125C transition
- 131 first projection (abutment projections)
- 131A, 131B abutment surface
- 132 second projection (pin projections)

A pivot axis
T12 dimension

What is claimed is:

1. An energy guide chain for at least one line, the energy guide chain having chain links and further comprising:
two lateral plate lines, each plate line includes a plurality of chain plates which are connected together pivotably relative to each other in a longitudinal direction and which each have a first overlap region and a second overlap region, and a plurality of side parts of plastic which each have two end regions;
the plurality of chain plates are made from a different material, of higher strength and/or stiffness, than the plurality of side parts;
at least in a portion of each of the plate lines, successive chain plates of the plurality of chain plates have through apertures in the first overlap region and through apertures in the second overlap region;
the through apertures of two of the successive chain plates of the plurality of chain plates at least partially overlap; and
said portion of each of the plate lines includes alternating first and second chain plates, and associated with each second chain plate is one of the side parts which, in each of the two end regions, has one or more projections, with which each end region of the side part engages through one of the first and the second overlap regions of the associated second chain plate, respectively, wherein the one or more projections of each end region of the side part engages through overlapping through apertures of the associated second chain plate and an adjoining first chain plate in order to limit the relative pivotal angle of the successive chain plates and/or to connect the successive chain plates;
wherein the successive chain plates comprise inner and outer chain plates which occur in succession alternately in laterally displaced relationship.

2. The energy guide chain according to claim 1, wherein in said portion of each of the plate lines each side part connects the associated second chain plate in the first overlap region of the associated second chain plate to an adjacent first chain plate and in the second overlap region of the associated second chain plate to another adjacent first chain plate.

3. The energy guide chain according to claim 1, wherein in said portion of each of the plate lines each of the chain plates in both the first and the second overlap regions have at least two first through apertures distributed around a respective pivot axis whose end regions abut at abutment surfaces of a corresponding first projection engaging therethrough to limit the pivotal angle.

4. The energy guide chain according to claim 1, wherein in said portion of each of the plate lines each of the chain plates in both the first and the second overlap regions have a circular through aperture concentrically on a respective pivot axis, into which aperture a projection of the side part coaxially engages which provides a rotary joint connection of the successive chain plates.

5. The energy guide chain according to claim 1, wherein the side parts are produced in one piece.

6. The energy guide chain according to claim 1, wherein the chain plates are produced from metal sheet or from fibre composite material.

7. The energy guide chain according to claim 1, wherein each of the side parts include a central region between the two end regions, wherein the central region has oppositely disposed narrow sides and at at least one of the narrow sides a projecting fixing pin for at least one transverse bar.

8. The energy guide chain according to claim 7, wherein two side parts are connected by two transverse bars and a fixing pin projects through a corresponding opening in the associated chain plate.

9. The energy guide chain according to claim 1, wherein all the chain plates and all the side parts are of substantially congruent external contours and/or are in a form of flat components without a cranked configuration or offset.

10. The energy guide chain according to claim 1, wherein the chain plates each have two oppositely disposed narrow sides and at at least one narrow side there is provided a transversely disposed stiffening region.

11. The energy guide chain according to claim 1, wherein the projections project from the side part with a dimension which is at least twice a plate thickness of a chain plate in the first or the second overlap region.

12. The energy guide chain according to claim 1, wherein provided at an end of the one or more projections for limiting the pivotal angle in each end region is at least one transverse extension, behind which a chain plate is engageable.

13. The energy guide chain according to claim 1, wherein at least one aperture is provided for limiting the pivotal angle in each of the first and the second overlap regions of the plurality of chain plates, wherein the at least one aperture has abutment-operative shaped edge or end regions, and/or shaped edge regions serving to form a rotary joint connection.

14. The energy guide chain according to claim 1, wherein the energy guide chain further comprises a first run, a second run and therebetween a direction-changing region, wherein the first run is fixed with an end region to an entrainment member of a relatively moveable connecting location, wherein a portion of each of the plate lines extends from the end region at the entrainment member over at least a third of an overall length of the energy guide chain.

15. The energy guide chain according to claim 1, wherein the two lateral plate lines have structurally identical chain plates, the first chain plates being structurally identical to the second chain plates, and wherein the two lateral plate lines have structurally identical side parts between respective end regions.

16. The energy guide chain according to claim 1,
wherein the plurality of chain plates are each made of metal; and
wherein the plurality of side parts are each made of plastic.

17. An energy guide chain for at least one line, the energy guide chain having chain links and further comprising:
two lateral plate lines, each plate line includes a plurality of chain plates which are connected together pivotably relative to each other in a longitudinal direction and which each have a first overlap region and a second overlap region, and a plurality of side parts of plastic which each have two end regions;
the plurality of chain plates are made from a different material, of higher strength and/or stiffness, than the plurality of side parts;
at least in a portion of each of the plate lines, successive chain plates of the plurality of chain plates have through apertures in the first overlap region and through apertures in the second overlap region;
the through apertures of two of the successive chain plates of the plurality of chain plates at least partially overlap; and said portion of each of the plate lines includes alternating first and second chain plates, and associated with each second chain plate is one of the side parts which, in each of the two end regions, has one or more projections, with which each end region of the side part engages through one of the first and the second overlap regions of the associated second chain plate, respectively, wherein the one or more projections of each end region of the side part engages through overlapping through apertures of the associated second chain plate and an adjoining first chain plate in order to limit the relative pivotal angle of the successive chain plates and/or to connect the successive chain plates;

wherein in said portion of each of the plate lines each of the chain plates in both the first and the second overlap regions have at least two first through apertures distributed around a respective pivot axis whose end regions abut at abutment surfaces of a corresponding first projection engaging therethrough to limit the pivotal angle.

18. An energy guide chain for at least one line, the energy guide chain having chain links and further comprising:

two lateral plate lines, each plate line includes a plurality of chain plates which are connected together pivotably relative to each other in a longitudinal direction and which each have a first overlap region and a second overlap region, and a plurality of side parts of plastic which each have two end regions;

the plurality of chain plates are made from a different material, of higher strength and/or stiffness, than the plurality of side parts;

at least in a portion of each of the plate lines, successive chain plates of the plurality of chain plates have through apertures in the first overlap region and through apertures in the second overlap region;

the through apertures of two of the successive chain plates of the plurality of chain plates at least partially overlap; and said portion of each of the plate lines includes alternating first and second chain plates, and associated with each second chain plate is one of the side parts which, in each of the two end regions, has one or more projections, with which each end region of the side part engages through one of the first and the second overlap regions of the associated second chain plate, respectively, wherein the one or more projections of each end region of the side part engages through overlapping through apertures of the associated second chain plate and an adjoining first chain plate in order to limit the relative pivotal angle of the successive chain plates and/or to connect the successive chain plates;

wherein in said portion of each of the plate lines each of the chain plates in both the first and the second overlap regions have a circular through aperture concentrically on a respective pivot axis, into which aperture a projection of the side part coaxially engages which provides a rotary joint connection of the successive chain plates.

* * * * *